United States Patent [19]

Morikawa et al.

[11] Patent Number: 5,573,338
[45] Date of Patent: Nov. 12, 1996

[54] AUTOMATIC PAPER FEEDER AND FRAME STRUCTURE OF DOCUMENT INPUT DEVICE

[75] Inventors: Shuichi Morikawa; Masahiko Futatsuka; Satoshi Ishida; Yasunori Miyauchi; Minoru Masuda, all of Ishikawa, Japan

[73] Assignees: PFU Limited, Ishikawa; Fujitsu Limited, Kanagawa, both of Japan

[21] Appl. No.: 507,292

[22] PCT Filed: Dec. 27, 1994

[86] PCT No.: PCT/JP94/02274

§ 371 Date: Aug. 24, 1995

§ 102(e) Date: Aug. 24, 1995

[87] PCT Pub. No.: WO95/18055

PCT Pub. Date: Jul. 6, 1995

[30] Foreign Application Priority Data

| Dec. 27, 1993 | [JP] | Japan | 5-330267 |
| Dec. 28, 1993 | [JP] | Japan | 5-336651 |
| Mar. 17, 1994 | [JP] | Japan | 6-95775 |
| Apr. 8, 1994 | [JP] | Japan | 6-73839 |
| May 11, 1994 | [JP] | Japan | 6-123009 |
| May 13, 1994 | [JP] | Japan | 6-124234 |

[51] Int. Cl.[6] ................................. B41J 11/26
[52] U.S. Cl. ............ 400/611; 400/624; 271/109; 271/121; 271/165; 271/167
[58] Field of Search ................... 400/605, 611, 400/624, 634, 636, 625; 271/109, 119, 121, 122, 165, 167

[56] References Cited

U.S. PATENT DOCUMENTS

| 4,575,068 | 3/1986 | Kato | 271/122 |
| 4,640,502 | 2/1987 | Habich et al. | 400/625 |
| 4,696,462 | 9/1987 | Tanaka et al. | 271/121 |
| 4,887,806 | 12/1989 | Tanava et al. | 271/121 |
| 5,163,668 | 11/1992 | Winship et al. | 271/121 |
| 5,253,854 | 10/1993 | Tanoue et al. | 271/122 |
| 5,277,416 | 1/1994 | Kim | 271/121 |
| 5,372,359 | 12/1994 | Miura et al. | 271/119 |
| 5,411,247 | 5/1995 | Ohsawa | 271/121 |
| 5,413,325 | 5/1995 | Dubois | 271/121 |
| 5,491,567 | 2/1996 | Morikawa et al. | 271/167 |

FOREIGN PATENT DOCUMENTS

| 59-30038 | 2/1984 | Japan . |
| 60-56640 | 4/1985 | Japan . |
| 63-60667 | 3/1988 | Japan . |
| 1-143468 | 6/1989 | Japan . |
| 2-72244 | 6/1990 | Japan . |
| 2-154247 | 6/1990 | Japan . |
| 3-107275 | 5/1991 | Japan . |
| 4-37136 | 3/1992 | Japan . |

*Primary Examiner*—Eugene H. Eickholt
*Attorney, Agent, or Firm*—Nikaido Marmelstein Murray & Oram LLP

[57] ABSTRACT

An automatic paper feeder of a document input device includes a pick roller 20, separator pads 68 that come into contact with the pick roller 20, a first pair of pick springs 58, and a second pick spring 60. The first pick springs 58 are disposed on the upstream side of the second pick spring 60 in the direction of conveying the paper. The first pick springs 58 are disposed on the regions on both outer sides of the width of the separator pads 68 in the axial direction of the roller, and the second pick spring 60 is disposed at a central position in the width of the separator pad 68. The first and second pick springs 58 and 60 are integrally formed as a spring unit using a single metal plate, and a force of contact of the first pick springs 58 upon the pick roller 20 on the upstream side is smaller than a force of contact of the second pick spring 60 upon the pick roller 20 on the downstream side. The separator pad 68 is formed by branching a web 70 of a rubber sheet into fork-like pad units. The spring unit and the pad units are supported together by a bracket 76 and a holder member 78 (FIG. 6).

24 Claims, 23 Drawing Sheets

5,573,338

AUTOMATIC PAPER FEEDER AND FRAME STRUCTURE OF DOCUMENT INPUT DEVICE

TECHNICAL FIELD

The present invention relates to a document input device such as of a copying machine, facsimile and the like, and it also relates to an automatic paper feeder mounted to the document input device to convey documents (papers carrying data to be read out) into the document input device.

BACKGROUND ART

An automatic paper feeder mounted to, for example, a copying machine includes a pick roller which takes out papers one by one from a stack of papers placed on a paper feed tray, and a feed roller for conveying the papers that are taken out by the pick roller. The pick roller is arranged to come into contact with the leading end of the lower surface of the lowermost paper of the stack of papers placed on the paper feed tray, and is rotated in a predetermined direction to take out the papers.

To take out the papers one by one, a pick spring and a separator pad are arranged to come into contact with the pick roller from the upper direction. The separator pad has a width narrower than the pick roller and is arranged nearly at the center in the axial direction of the pick roller. The pick spring has the shape of a fork with its two legs arranged to come into contact with the pick roller on both sides of the separator pad. The pick spring pushes the paper onto the pick roller, so that the lowermost paper of the stack of papers is brought into frictional engagement with the pick roller; i.e., as the pick roller rotates, the paper is drawn by the pick roller due to frictional force. The separator pad is made of a rubber sheet or the like, comes into frictional engagement with the upper surface of a second paper from the lower side which is not in direct contact with the pick roller, and prevents the second paper from advancing together with the paper that is being taken out. Thus, the lowermost paper only is separated and is taken out while preventing a plurality of other papers from being taken out overlapped one upon the other.

In the automatic paper feeder, a variety of papers having different thicknesses and different stiffnesses are used. It is therefore desired that the automatic paper feeder is capable of separating and taking out a variety kinds of papers reliably one by one. Furthermore, in the automatic paper feeder, a failure in picking papers may occur when the amount of papers stacked on the paper feed tray decreases.

In order for the papers to be reliably taken out up to the last piece without picking miss, it is desired that a position (picking position) at which the pick spring comes into contact with the pick roller is located slightly on the upstream side of a position (separating position) at which the separator pad comes into contact with the pick roller in the direction in which the paper is fed. In this case, however, a gap is formed between the picking position and the separating position, and an increase in the gap invites an occurrence of paper jamming between the picking position and the separating position. Therefore, difficulty is involved in determining whether the pick spring and the separator pad be arranged at positions close to each other or whether they be arranged at positions remote from each other in the stage of designing. So far, the picking position has been located on the upstream side of the separating position by only a small amount in the direction in which the paper is fed, so that the papers are reliably taken out up to the last piece resulting, however, in the occurrence of pick miss as the amount of papers decreases. Moreover, the pick spring and the separator pad are interfered by each other in regard to their positions when they are arranged at positions very close to each other in the direction in which the paper is fed. To avoid this, therefore, the pick spring has been formed in the shape of a fork with its both legs being located on both sides of the separator pad.

In order to reliably separate the paper by the frictional force, furthermore, the separator pad must be brought into the pick roller with a strong force of contact, or the separator pad must be lengthened to increase the area of contact. When the force of contact becomes too great, however, the paper enters into between the pick roller and the separator with difficulty. When the contact area increases, the paper fails to come into uniform contact with the separator pad in the direction of width thereof due to error in the machining or backlash, causing the paper to be skewed.

In a document input device having an automatic paper feeder, furthermore, an optical read unit including an image scanner and the like is provided in the main device (frame) and is allowed to move along a carrier axis by a belt or the like. A glass plate is secured to a top plate of the main device to place a paper (document) thereon. With the paper (document) being placed still on the glass plate, the data are read out by an optical read unit. The automatic paper feeder may also work to convey the paper (document) to an end region of the glass plate to read the data by the optical read unit while the paper (document) is moving. The frame of such a device must have a sufficient degree of strength to support the moving optical read unit cutting off vibration. It is further desired that the top plate having glass plate is on a plane in parallel with the optical unit, that the top plate having glass plate and the carrier shaft are so arranged as to maintain a correct positional relationship, and that the device can be produced at a reduced cost.

Moreover, the frame of the device undergoes expansion and contraction depending upon the temperature. The frame that is substantially made of a metallic material only undergoes thermal expansion and contraction little. Though the cost can be decreased if the frame is partly made of a resin-molded article, it is desired that the top plate of the frame is made of a metallic material to maintain stiffness. When the frame is made up of a metallic material and a resin material that are arranged being facing each other, there develops a difference in the thermal deformation between the two to a degree that cannot be neglected, which turns out to be error in the reading of data.

SUMMARY OF INVENTION

The object of the present invention is to provide an automatic paper feeder that is capable of reliably feeding a variety kinds of papers having different thicknesses and stiffnesses up to the last piece without developing picking miss or double feeding.

Another object of the present invention is to provide an automatic paper feeder which is small in size, simple in structure and develops trouble little.

A further object of the present invention is to provide an automatic paper feeder which is capable of separating the papers without permitting them to be skewed.

A still further object of the present invention is to provide a frame structure of a document input device in which a top plate having glass plate, an optical unit and a carrier shaft thereof are arranged maintaining a correct positional relationship, and which can be produced at a reduced cost.

A yet further object of the present invention is to provide a frame structure of a document input device which has a frame made up of a resin member and a metallic member, which does not permit a positional relationship among a top plate, an optical read unit and a carrier shaft thereof to be affected by a change in the temperature, and which is fabricated using a decreased number of parts.

An automatic paper feeder, according to the present invention, comprises a pick roller disposed at a position where it comes into contact with the leading end of a paper to be taken out, the pick roller having a roller axis and a predetermined conveying direction, a separator pad disposed to come into contact with said pick roller and having a width in the axial direction of said roller, a first pair of pick springs disposed as to come into contact with said pick roller, and a second pick spring disposed to come into contact with said pick roller. Said first pick springs and said second pick spring are disposed to come into contact with said pick roller at different positions in said conveying direction, said first pick springs being disposed in both regions on the outside of the width of said separator pad in the axial direction of the roller, said second pick spring is disposed in a region of the width of said separator pad in the axial direction of the pick roller, the pick spring of said first and second pick springs located on the upstream side in said conveying direction are brought into contact with said pick roller with a force smaller than a force with which the pick spring is brought into contact with the pick roller located on the downstream side.

BRIEF DESCRIPTION OF THE DRAWINGS

Other objects and advantages of the present invention will become apparent from the following description of embodiments in conjunction with the accompanying drawings in which.

BEST MODE FOR CARRYING OUT THE INVENTION

Figure 1:
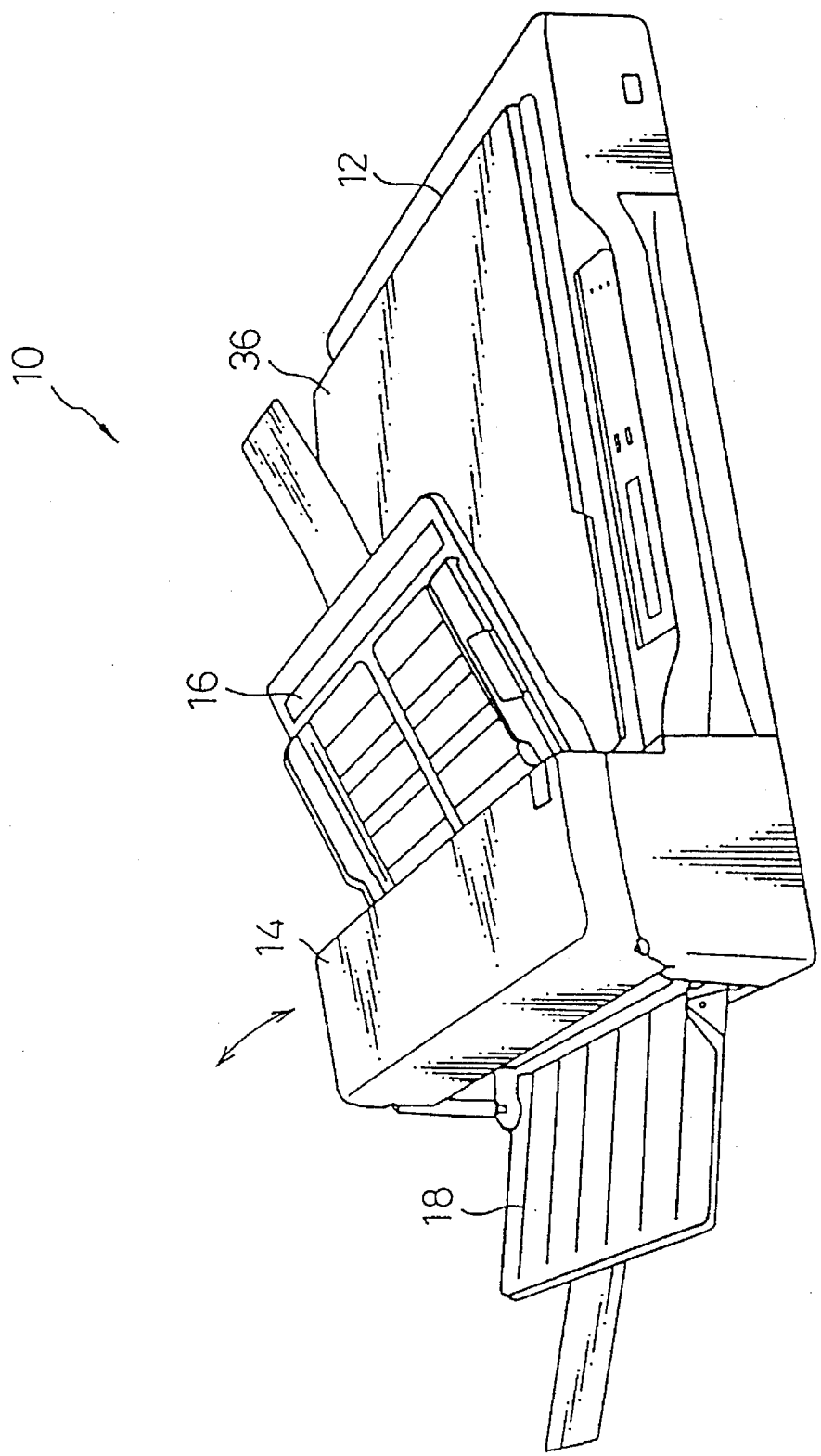
FIG. 1 is a perspective view illustrating a document input device according to the first embodiment of the present invention.
Figure 2:
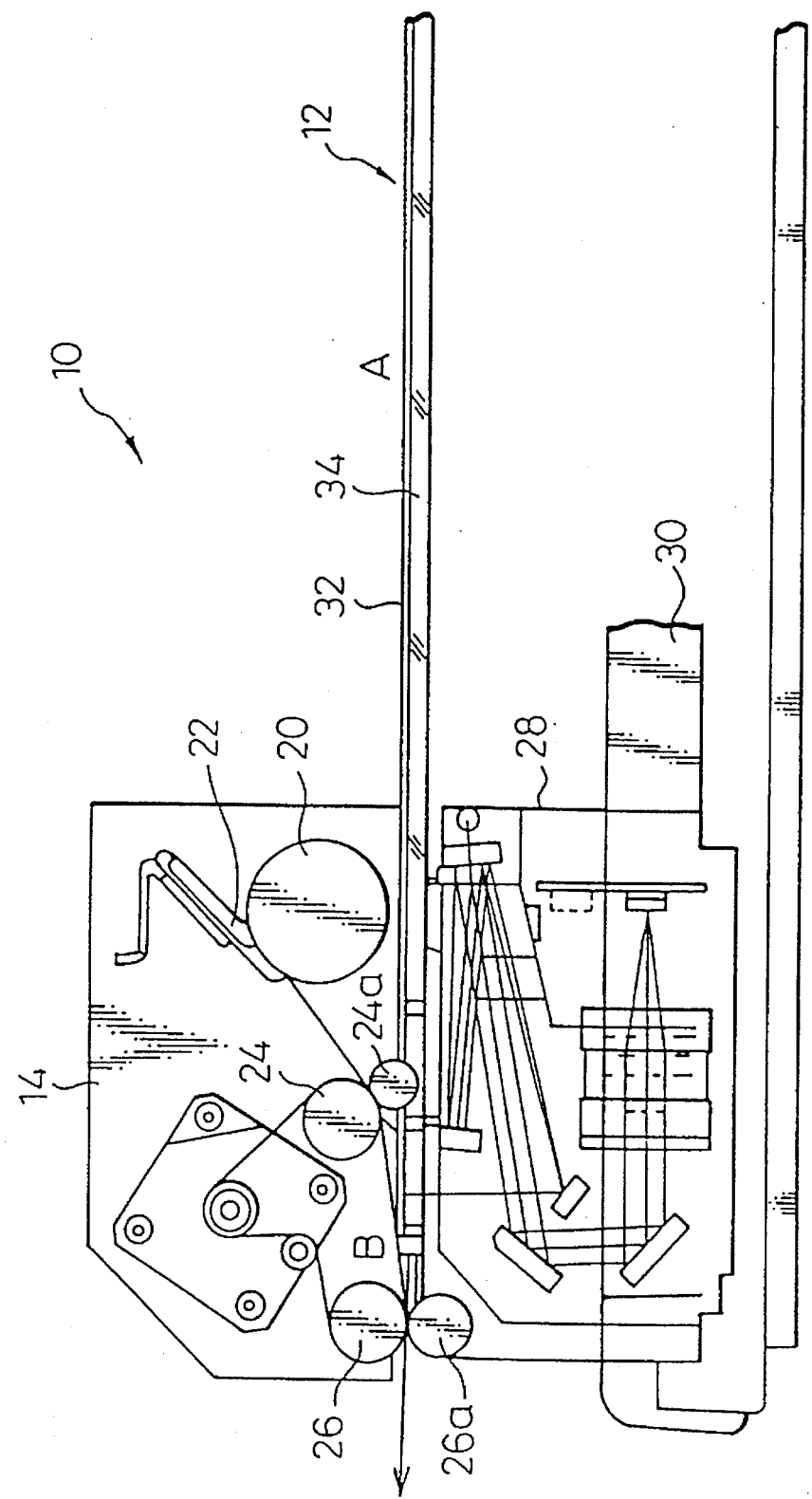
FIG. 2 is a cross-sectional view illustrating the interior of the document input device of FIG. 1.

Referring to FIGS. 1 and 2, a document input device 10 according to the present invention includes a main body 12, a paper feeding unit 14 mounted on the main body 12, a paper feeding tray 16 mounted on the paper feeding unit 14, and a discharge tray 18. A stack of papers (documents) to be read is inserted in the paper feeding tray 16, fed in the main body 12 by the paper feeding unit 14, and is discharged from the discharge tray 18.

The paper feeding unit 14 includes a pick roller 20, a paper separator unit 22 that works in cooperation with the pick roller 20, and first and second feed rollers 24 and 26. The pick roller 20 is disposed to come into contact with the leading end of the lower surface of the lowermost paper of the stack of papers held in the paper feeding tray 16, and is rotated in a predetermined direction to take out the paper in a predetermined conveying direction. The paper separator unit 22 works in cooperation with the pick roller 20 to take out the lowermost paper of the stack of papers one by one, and its details will be described later. The feed rollers 24 and 26 work in cooperation with nip rollers 24a and 24b in order to convey the paper while nipping the paper between these rollers.

The main body 12 has an optical reading unit 28 that includes an image scanner, the optical read unit 28 being allowed to move along a carrier shaft 30. The main body 12 includes a top plate 32 which has a transparent glass plate 34 covering the opening of the top plate 32. The paper (document) is placed on a region A of the glass plate 34 to read the data by the optical read unit 28 while the paper (document) is stationary. The automatic paper feeder 14, on the other hand, may convey the paper (document) to a region B at an end of the glass plate 34 to read the data by the optical read unit 28 while the paper (document) is being conveyed by the feed rollers 24 and 26.

Figure 3:
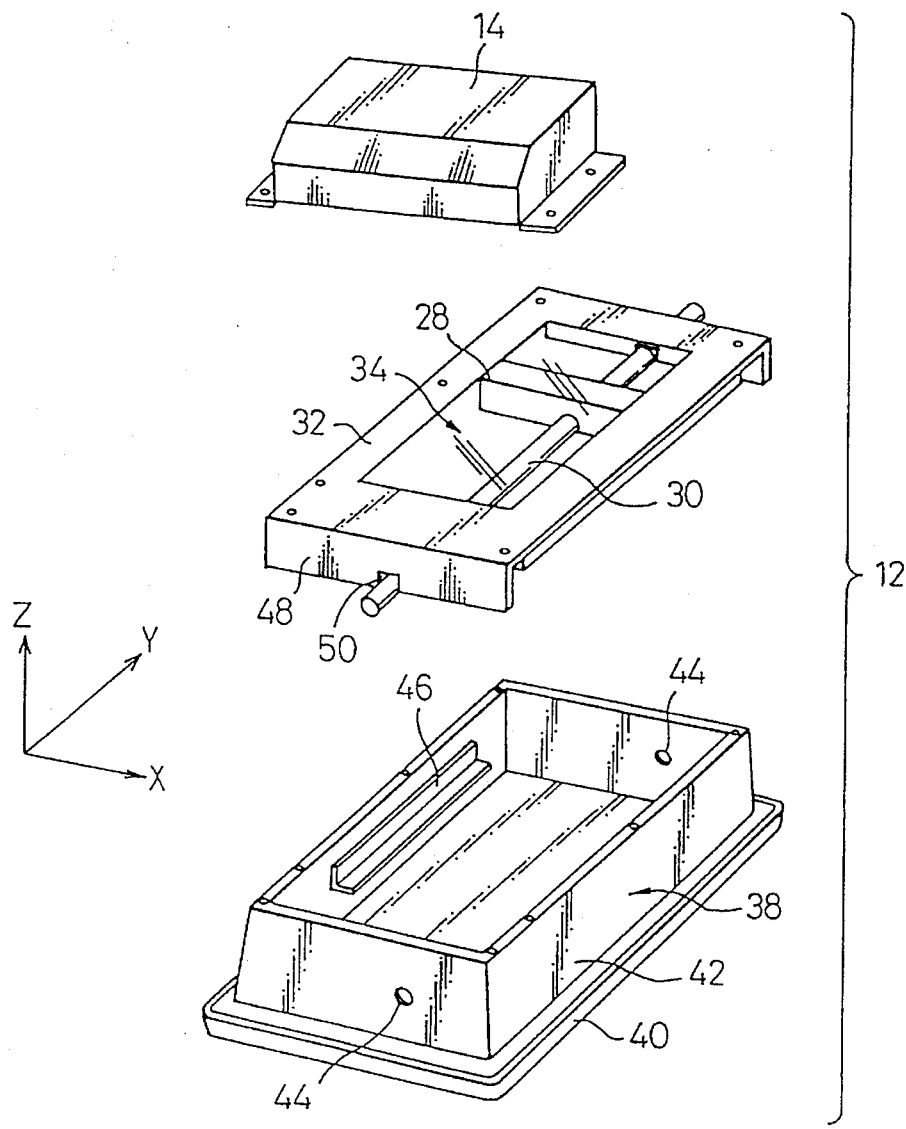
FIG. 3 is a perspective view illustrating, in a disassembled manner, a housing of the document input device of FIGS. 1 and 2.
Figure 4:
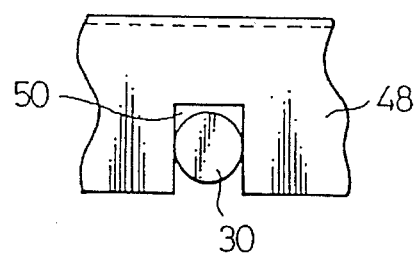
FIG. 4 is a partial cross-sectional view illustrating a top frame member of the housing of FIG. 3.

Referring to FIGS. 3 and 4, the main body 12 includes a base frame member 38 formed as a resin molded article and a top frame member 48 made of a metallic material (e.g., steel). The base frame member 38 has a base 40 and an annular frame 42 made up of side walls that are formed integrally with the base 40 and nearly upwardly extend from the base 40. The top frame member 48 includes a top plate 32 having an opening, and side walls 48 that are formed integrally with the top plate 32 and downwardly extend from the top plate 32. The top frame member 48 is combined with the base frame member 32 and is secured thereto by screws or the like to form an outer frame of the device. The glass plate 34 is stuck with a double-sided adhesive tape or the like to the top plate 32 as a unitary structure to cover the opening of the top plate 32.

The annular frame 38 of the base frame member 38 has two holes 44 formed in the two opposing side walls, and has a rail 46 secured to another side wall thereof. The carrier shaft 30 is inserted in these holes 44 and is secured. The optical read unit 28 moves along the carrier shaft 30 and the rail 46 in parallel with the glass plate 34.

The top frame member 48 has notches 50 formed at lower ends of the side walls 48, the notches 50 coming into engagement with the carrier shaft 30 when the top frame member 48 is combined with the base frame member 38. Therefore, the top frame member 48 is fitted to the carrier shaft 30 while being slid and is correctly positioned relative to the carrier shaft 30. Owing to this engagement, the optical reading unit 28 is positioned in a direction in parallel with the glass plate 34 passing through the carrier shaft 30 and in a direction perpendicular to the glass plate 34 passing through the carrier shaft 30, making it easy to maintain parallelism between the glass plate 34 on which the document is placed and the optical reading unit 28 and to maintain a right angled relationship between the optical reading unit 28 and the carrier shaft 30. It is further allowed to maintain proper positional relationship among these members. The top frame member 48 is constituted by a metallic rigid member that is completely continuous except for the opening in the top plate 32, and maintains required dimensional precision. Therefore, the distance between the glass plate 34 and the optical read unit 28 is constant at all times, i.e., the length of the optical path is constant at all times, and the top plate 32 is limited by the carrier shaft 30.

Figure 5:
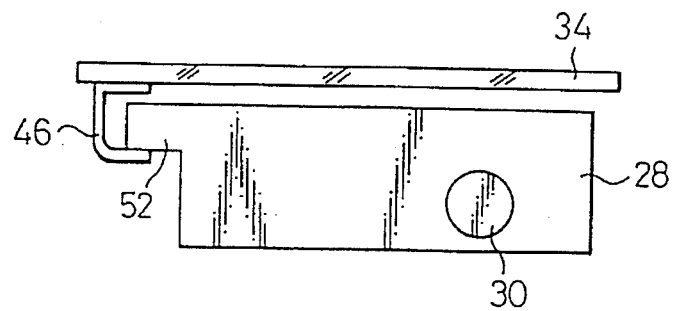
FIG. 5 is a view illustrating a modified example of the top frame member.

In FIG. 5, the rail 46 is fixed to the glass plate 32 of the top frame member 48, and the optical read unit 28 has an engaging portion 52 that engages with the rail 46. In this case, therefore, the rail 46 itself serves as an engaging portion for positioning. The optical read unit 28 is slidable along the carrier shaft 30 and the rail 46 provided in the base frame member 38. In this embodiment, the optical reading unit 28 moves along the glass plate 34 via the rail 46 and, hence, the glass plate 34 serves as a reference position in the document read direction Y, offering improved image read precision compared with those in which the rail 46 is secured to the frame 42 of FIG. 1.

FIGS. 6 to 12 are views illustrating in detail the paper separator unit 22. The paper separator unit 22 includes a spring unit 54 shown in FIG. 9 and a pad unit 56 shown in FIG. 8, which are mounted to a bracket 76.

The pad unit 56 comprises a fork-shaped web 70 of a rubber sheet, and is divided at its end into two pad pieces 68. Holes 72 are provided in the base connection portion of the rubber sheet web 70, and engaging protrusions 82 of a pad holder 78 are inserted in the holes 72.

The spring unit 54 comprises a web 62 obtained by cutting and folding a piece of spring plate, and has a first pair of pick springs 58 and a second pick spring 60. The first pair of pick springs 58 and the second pick spring 60 are disposed to come into contact with the pick roller 20 at different positions in the direction in which the paper is conveyed. The first pair of pick springs 58 are disposed in the regions on the outside of the width of the web 62 of the separator pad in the axial direction of the roller. The second pick spring 60 is disposed in a region of the width of the separator pad web 62 in the axial direction of the roller. In this embodiment, the second pick spring 60 is positioned in a slot 74 between the two neighboring pad pieces 68.

The second pick spring 60 extends in a slightly folded manner from the center of the coupling portion of the web 62 toward the roller 20, and has at its front end a shallow U-shaped bent portion 60a. The first pick springs 58 extend in a direction opposite to the second pick spring 60 from both ends of the coupling portion of the web 62, and have their base portions bent in a U-shape so as to be headed in the same direction as the second pick spring 60. The web of pick springs has holes 64 corresponding to the holes 72 of the web 70 of the separator pad.

Figure 6:
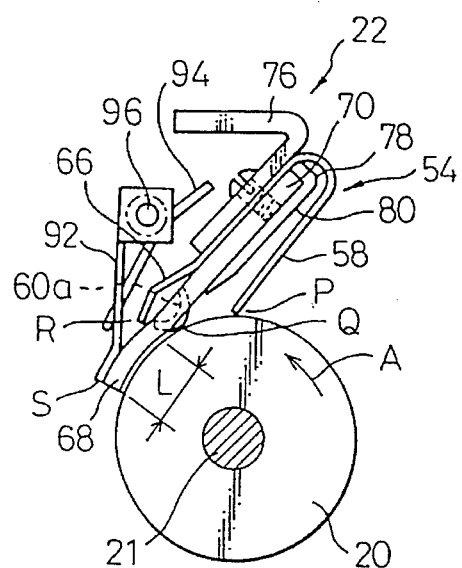
FIG. 6 is a cross-sectional view illustrating in detail the automatic paper feeder in the document input device of FIGS. 1 and 2.
Figure 7:
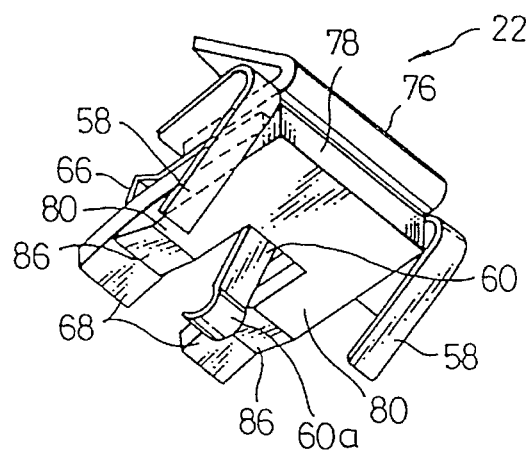
FIG. 7 is a perspective view illustrating a paper separator unit of FIG. 6.
Figure 8:
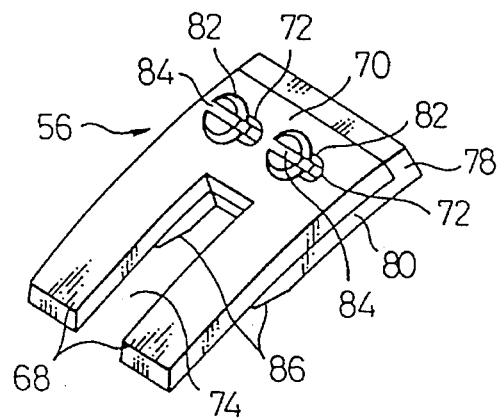
FIG. 8 is a perspective view illustrating a pad unit of FIGS. 6 and 7.
Figure 9:
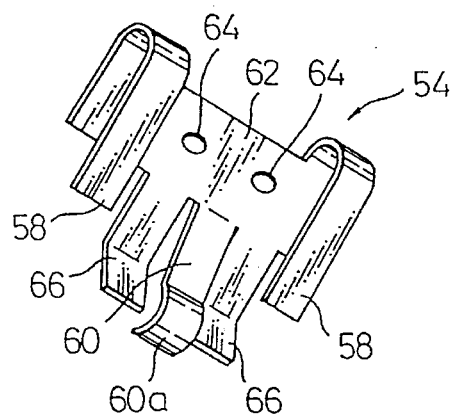
FIG. 9 is a perspective view illustrating a spring unit of FIGS. 6 and 7.

Referring to FIG. 6, a position at which the first pick springs 58 come into contact with the pick roller 20 is denoted by P, and a position at which the second pick spring 60 comes into contact with the pick roller 20 is denoted by Q. The contacting positions P of the first pick spring 58 are slightly on the upstream side of the contacting position Q of the second pick spring 60 in the direction in which the paper is conveyed. Something contacts the peripheral surface of the roller 1.

Deflecting amounts at the tips of the first pick springs 58 and of the second pick spring 60 when they are in contact with the pick roller 20 are so adjusted that a force of contact of the first pick springs 58 upon the pick roller 20 is smaller than a force of contact of the second pick spring 60. The first pick springs 58 have their base ends folded in a U-shape so as to have an extended length and, hence, to have more soft resilient property than the second pick spring 60. That is, the first pick springs 58 have not only a smaller force of contact upon the pick roller 20 than that of the second pick spring 60 but also a smaller increment of resilient repulsive force of when the spring is deflected by the paper that is introduced than that of the second pick spring 60.

The web 62 of the spring unit 54 further has first urging springs 66 that extend from the coupling portion of pick springs 58, 60 nearly in parallel with the second pick spring 60. The first urging springs 66 extend in flush with the web 62 and have their ends folded in a <-shape toward the pick roller 20. The first urging springs 66 are formed on both sides of the second pick spring 60 maintaining a width slightly smaller than the width of the pad pieces 68. The first urging springs 66 are so mounted as to come into contact at their tips with the back surface of the pad piece 68 in a state where they are deflected toward a side opposite to the pick roller 20, in order that the pad piece 68 is urged toward the pick roller 20 utilizing the resilient force produced by the deflection.

The pad pieces 68 have a length L in the direction in which the paper is conveyed. The position R at which the first urging springs 66 are brought into contact with the pad pieces 68 is close to the upstream end of the contact portion L of the pad pieces 68 in the direction in which the paper is conveyed. To the bracket 76 is secured a shaft 96 in a direction perpendicularly to the surface of the paper in FIG. 6. To the shaft 96 is swingingly attached a second plate-like urging spring 92. A cylindrically coiled spring 94 urges the back surface of the second urging plate 92 toward the pick roller 20, so that the second urging plate 92 pushes the tips of the pad pieces 68. Therefore, the tips of the pad pieces 68, i.e., the downstream end of the paper in the direction in which it is conveyed is resiliently pushed toward the peripheral surface of the pick roller 20 by the cylindrically coiled spring 94 via the second urging plate 92 and whereby the contact is maintained between the pad pieces 68 and the peripheral surface of the pick roller 20 over a section L in the direction in which the paper is conveyed.

Figure 10:
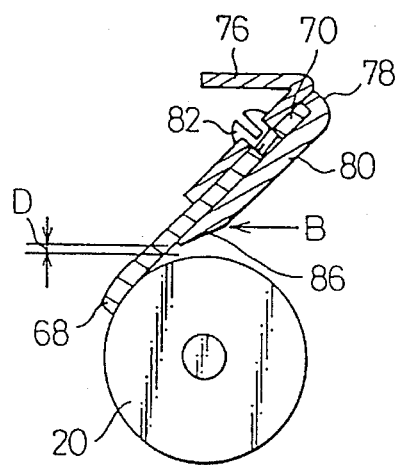
FIG. 10 is a cross-sectional view illustrating a pad unit holder member.
Figure 11:
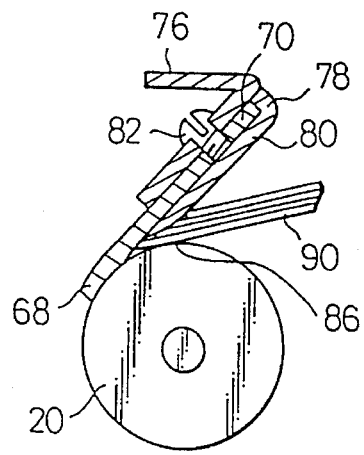
FIG. 11 is a cross-sectional view for illustrating a modified example of the holder member.

The pad unit 56 and the spring unit 54 are secured to the bracket 76 by a pad holder 78 made of a synthetic resin. The pad holder 78 has a holding portion 80 which embraces the web 70 of the separator pad as shown in FIG. 6, and the tip of the surface of the holding portion 80 on the side of the pick roller 20 (front surface on the side opposite to the separator pad) is forming a wedge surface 86 which is tilted to become thinner toward the end of the holding portion 80 as shown in FIG. 10. The wedge surface 86 shown in FIG. 10 is of a planar shape, and the wedge surface 86 shown in FIG. 11 is of a curved shape.

The tip of the holding portion 80 of the pad holder 78 is facing the peripheral surface of the pick roller 20 maintaining a small gap D. When plural pieces of papers are fed toward the separator pad unit 56, the ends of the upper papers come into contact with the wedge surface 86 of the holding portion 80, whereby the force for feeding the papers indicated by arrow B in FIG. 10 is converted into the force directed to the peripheral surface of the pick roller 20 due to the guiding action of the wedge surface 86. Accordingly, an increased force acts on the lowermost paper so as to be pushed onto the peripheral surface of the pick roller 20, and an increased paper-feeding force acts upon the lowermost paper. This force becomes stronger such as when a number of papers are stacked so that a stack of papers have an increased weight enabling the lowermost paper to be difficultly conveyed.

Figure 12:
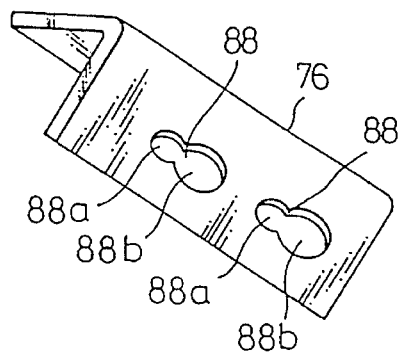
FIG. 12 is a perspective view illustrating a bracket for mounting the spring unit and the pad unit of FIGS. 6 and 7.

Two engaging protuberances 82 having slit 84 are integrally formed on the holding surface of the holding portion 80 of the pad holder 78. In the bracket 76 are formed two potbelly holes 88 each being made up of a small-diameter portion 88a and a large-diameter portion 88b that are communicated with each other (FIG. 12). The engaging protuberances 82 of the pad holder 78 are inserted in the holes 72 and 64 of the pad unit 56 and spring unit 54, and are further inserted in the large-diameter portions 88b of potbelly holes 88 in the bracket 76. The pad holder 78 is then laterally moved so that the protuberances engage with the small-diameter portions 88a of potbelly holes 88. Thus, the pad unit 56 and spring unit 54 are secured being held between the bracket 76 and the holding portion 80 of the pad holder 78.

In operation, the lowermost paper is in contact with the pick roller 20 due to its own weight. As the pick roller 20 rotates, the lowermost paper is drawn and is inserted into between the first pick springs 58 and the pick roller 20. Since the first pick springs 58 have a small resilient force, even the final piece of paper which is in contact with the pick roller 20 can be taken into between the first pick springs 58 and the pick roller 20.

When the paper is not the final piece, plural pieces of papers will usually enter into between the first pick springs 41 and the pick roller 20. When many papers are going to enter, the ends of the upper papers come into contact with the wedge surface 86 at the tip of the holding portion 80 of the pad holder 78, whereby the papers are blocked from being further fed. Due to the action of the wedge surface 86, furthermore, the lowermost paper is further pushed onto the peripheral surface of the pick roller 20. The lowermost paper and several pieces of papers thereon enter into between the second pick springs 60 and the pick roller 20, and a large feeding force acts on the lowermost paper due to urging force of the second pick spring 60.

Due to this feeding force, the lowermost paper is fed into a portion where the separator pad pieces 68 and the pick roller 20 are contacting together, and the second and subsequent papers that are being fed accompanying thereto are prevented from entering at a first position where the separator pad pieces 68 are in contact, and the lowermost piece only passes through between the pick roller 20 and the separator pad pieces 68. In this case, even when the paper has a small thickness, the paper-feeding force and the resistive force are dispersed in the direction of width of the paper and occurrence of paper jamming is avoided, since the point of action of feeding force by the second pick spring 60 is close to the center of action of resistive force from the split pad pieces 68, and since the paper-feeding force is given even at positions on both sides of the pad pieces 68 due to the first pick springs 58.

Figure 14:
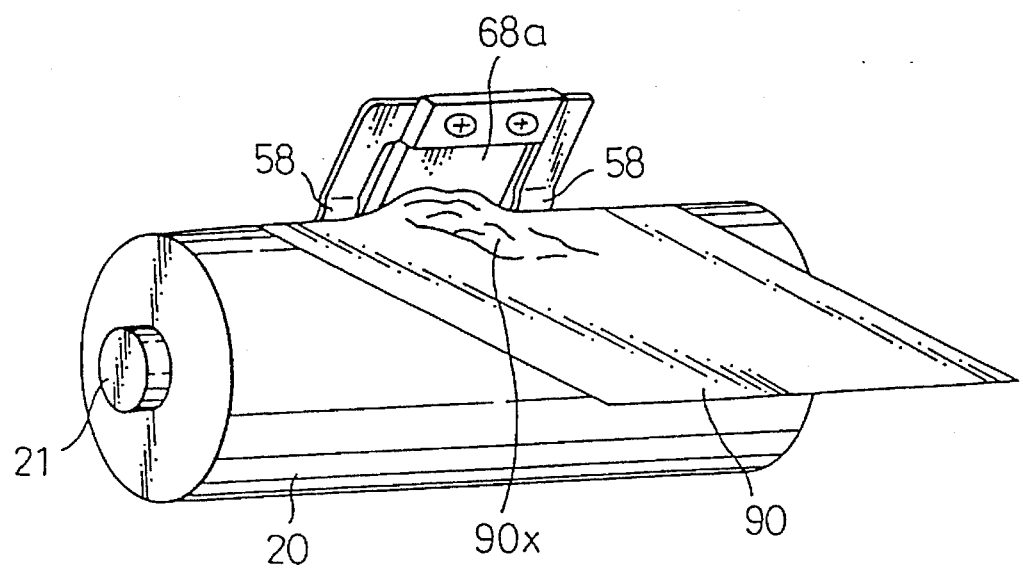
FIG. 14 is a view illustrating a prior art permitting the occurrence of jamming.
Figure 15:
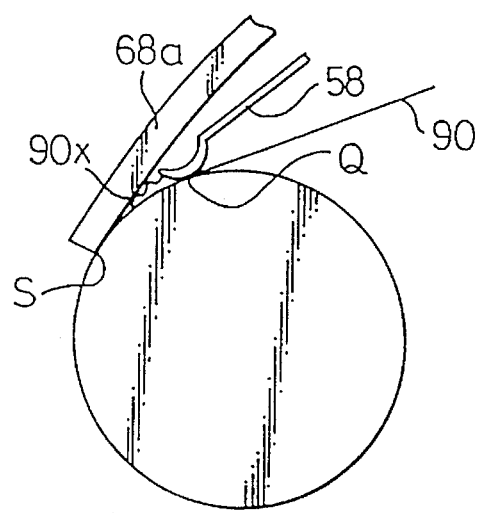
FIG. 15 is a cross-sectional view of the device of FIG. 14.
Figure 16:
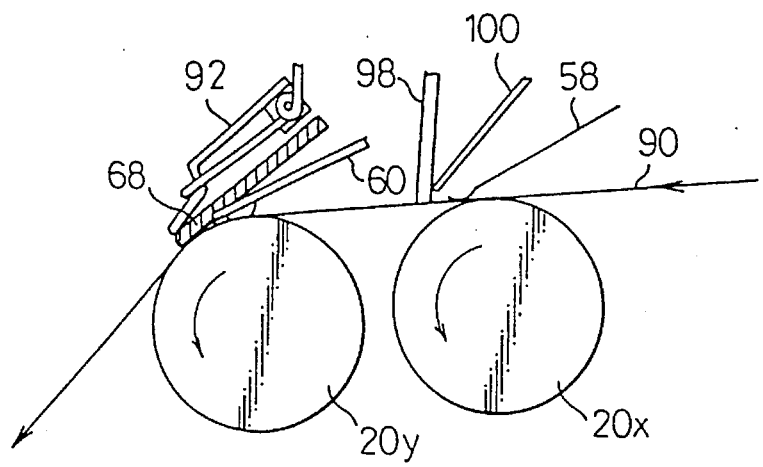
FIG. 16 is a cross-sectional view illustrating a paper separator unit according to the second embodiment of the present invention.
Figure 17:
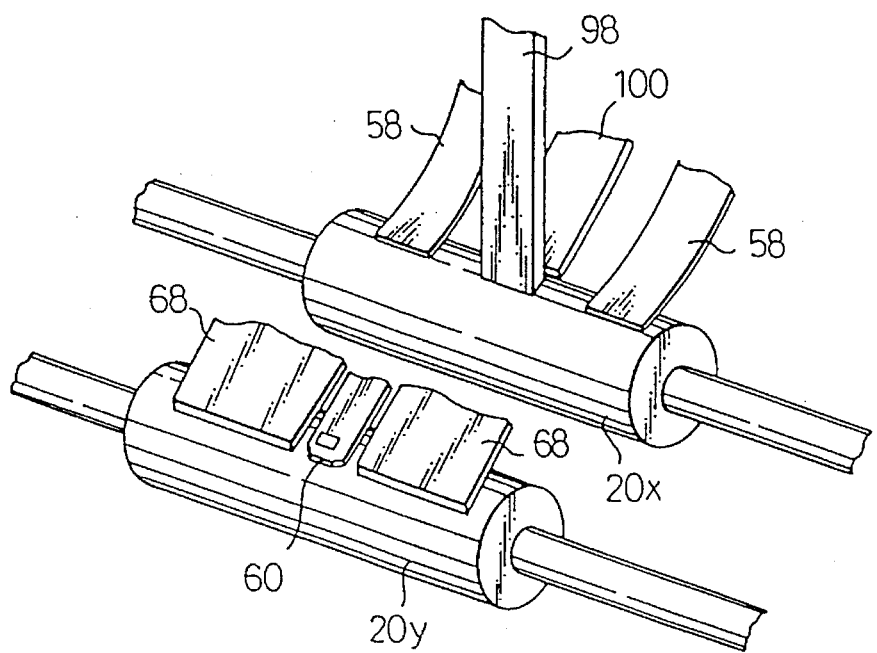
FIG. 17 is a perspective view illustrating the paper separator unit of FIG. 16.

In the prior art shown in FIGS. 14 and 15, pick springs corresponding to the first pick springs 58 had been used for the separator pads 68a but no pick spring corresponding to the second pick spring 60 had been used arousing, therefore, a problem that the papers 90 are subject to developing jamming 90x. The present invention eliminates the occurrence of jamming 90x.

When the paper has a large stiffness or a large thickness, the second and subsequent papers are not separated at the first contact points of pad pieces 68 and may, hence, enter into between the pad pieces 68 and the pick roller 20. In such a case, resistive force is kept imparted to the second and subsequent papers from the pad pieces 68 over the section L having a given length in the direction in which the paper is conveyed, to assist the separation of the lowermost paper.

According to the automatic paper feeder of the present invention as described above, the papers can be reliably fed up to the final piece of paper avoiding the jamming of thin papers and double feeding.

Figure 13:
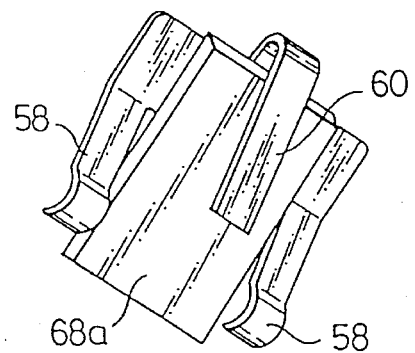
FIG. 13 is a perspective view illustrating a modified example of the first and second pick springs and the separator pad.

In the foregoing was described the most preferred embodiment of the present invention by way of FIGS. 1 to 6. The present invention, however, is in no way limited to the above-mentioned embodiment only. FIG. 13 illustrates another embodiment of the present invention using a separator pad 68a that is not split, arranging the first pick springs 58 on both outer sides of the separator pad 68a on the downstream side in the direction in which the paper is conveyed, and arranging the second pick spring 60 in the region of the width of the separator pad 68a in the direction of width of roller on the upstream side in the direction in which the paper is conveyed.

FIGS. 16 to 21 are views illustrating the second embodiment of the present invention. In this embodiment, the pick roller 20 of the aforementioned embodiment is constituted by a pick roller 20x and a separator roller 20y. The first pair of pick springs 58 are arranged to come into contact with the pick roller 20x. A gate 98 is provided to come into contact with the pick roller 20x between the first pair of pick springs 58 to suppress the feed of papers when the papers are picked by the pick roller 20x in a number larger than a predetermined number. A sheet 100 is provided near the upstream side of the gate 98 to prevent the upwardly curled paper from turning up.

The split pad pieces 68 are so arranged as to come into contact with the separator roller 20y, and inhibit the conveyance of papers that are not intimately contacted to the separator roller 20y relying upon the frictional action. The second pick spring 60 is so arranged as to come into contact with the separator roller 20y between the pad pieces 68, and restricts a plurality of papers from entering into between the pad pieces 68 and the separator roller 20y utilizing the urging force of the urging member 92.

Figure 18:
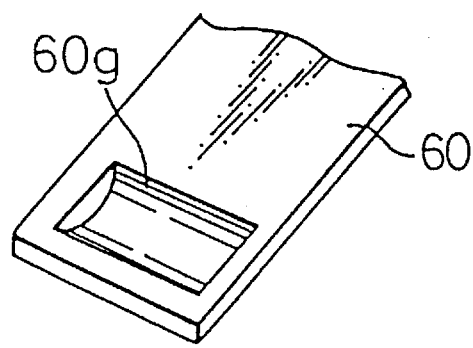
FIG. 18 is a perspective view illustrating part of the second pick spring of FIGS. 16 and 17.

Referring to FIG. 18, the second pick spring 60 is drawn as designated at 60g so that a concentrated load will not be given to the paper, and the drawn portion 60g is brought into contact with the paper.

Figure 20:
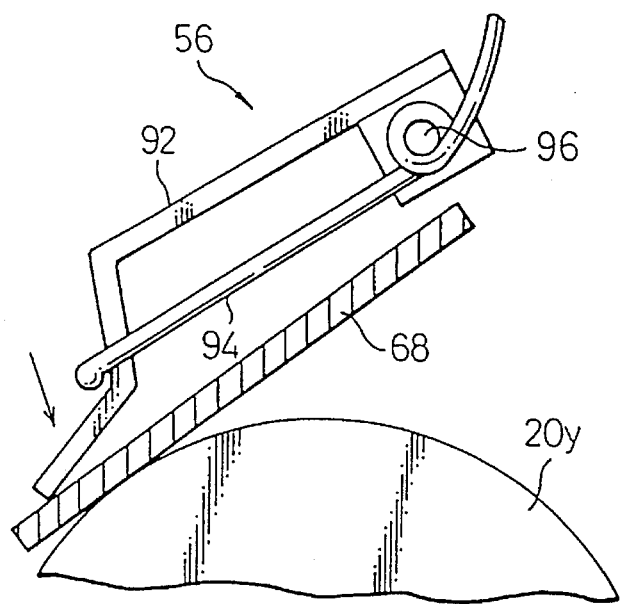
FIG. 20 is a sectional view illustrating the separator pad and an urging member of FIG. 6.
Figure 21:
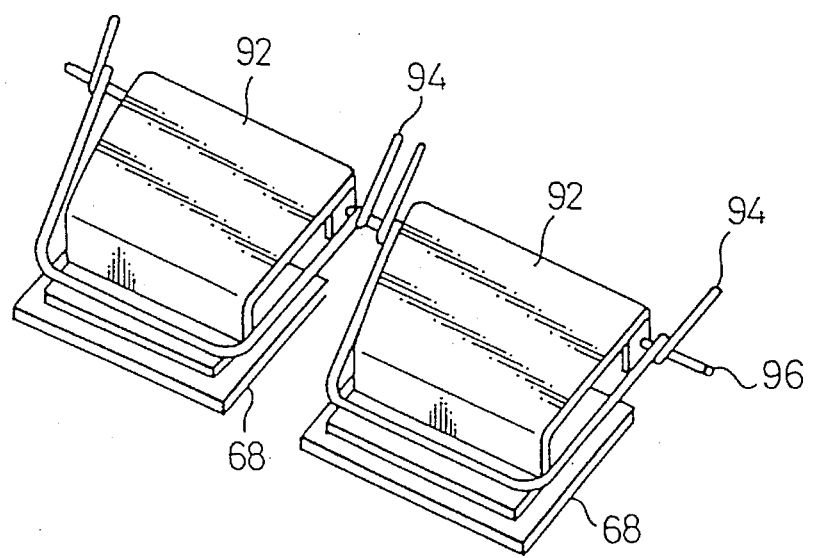
FIG. 21 is a perspective view illustrating the separator pad and the urging member of FIG. 20.

Referring to FIGS. 20 and 21, the pad pieces 68 are pushed by the urging plates 92, and springs arranged about the shaft 96 give urging force to the urging plates 92.

In this embodiment which comprises the pick roller 20x, first pick springs 58 that come into contact with the pick roller 20x, separator roller 20y, and pad pieces 68 that come into contact with the separator roller 20y, the pad is split to form pad pieces 68 so as to possess long contact areas in the axial direction of the separator roller 20y and so as to come into contact with the separator roller 20y being urged by different urging means 92.

Therefore, even when the pair of pad pieces 68 forming pad are allowed to have an increased length in the axial direction of the roller, the pad comes into uniform contact with the paper preventing the paper from being skewed. By utilizing the advantage of increasing the length of the pad in the axial direction of the roller, therefore, it is allowed to take out the papers piece by piece.

Figure 22:
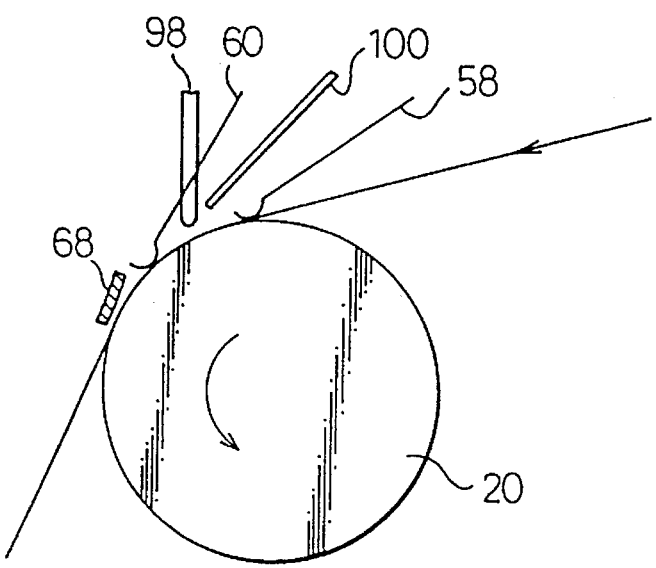
FIG. 22 is a cross-sectional view illustrating the pick spring and the separator pad according to the third embodiment of the present invention.
Figure 23:
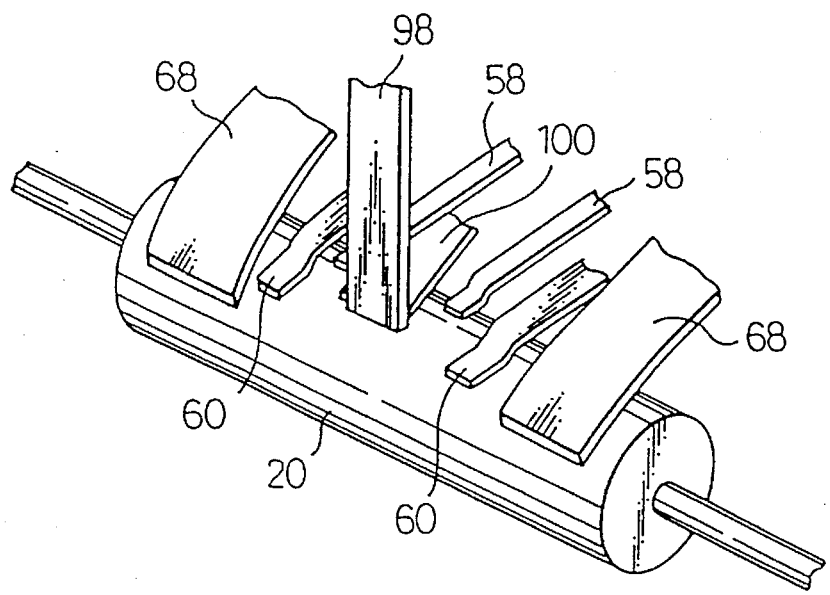
FIG. 23 is a perspective view illustrating the pick spring and the separator pad of FIG. 22.

FIGS. 22 and 23 illustrate the third embodiment of the present invention. This embodiment has first and second pick springs 58, 60 for a single pick roller 20. The gate 98 is so provided as to come into contact with the pick roller 20 between the first pair of pick springs 58, and the sheet 100 is provided near the gate 98 on the upstream side thereof to prevent the upwardly curled paper from turning up.

Figure 19:
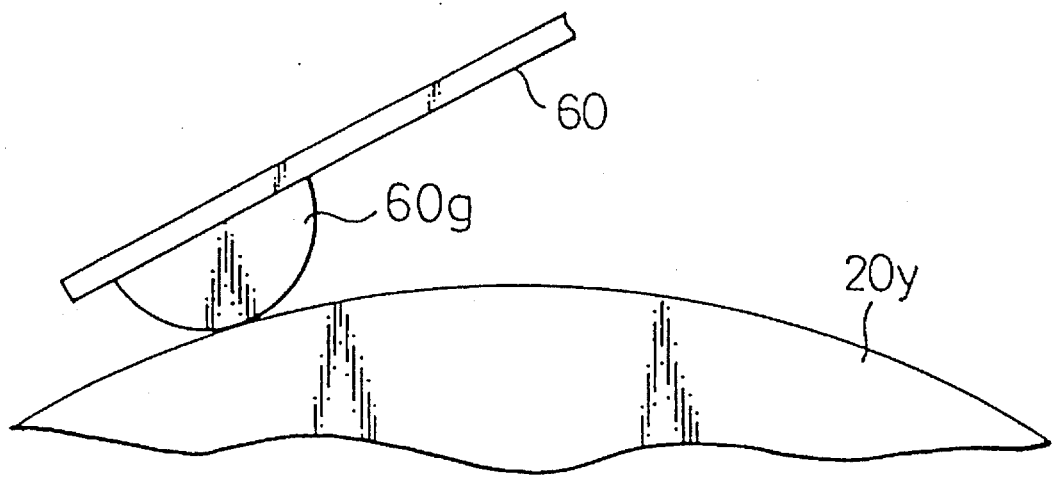
FIG. 19 is a perspective view of the second pick spring of FIG. 18.

Like in the above mentioned embodiment, the split pad pieces 68 are disposed to come into contact with the pick roller 20 and inhibit the conveyance of papers that are not intimately contacted to the pick roller 20 by utilizing the frictional action. The second pick springs 60 are provided on the downstream side of the first pick springs 58 but on the upstream side of the split pad pieces 68. It is desired that the second pick springs 60 are draw-formed in a shape as shown in FIG. 19 so will not to give a concentrated load to the paper.

In this embodiment, the pad is split into pad pieces 68 so as to have a contact area which is lengthened in the axial direction of the pick roller 20 and so as to be brought into contact with the pick roller 20 being urged by separate urging means 92. Therefore, despite an increase in the total length of the pad, the pad comes into uniform contact with the paper making it possible to prevent the paper from being skewed. By utilizing the advantage of an increase in the total length of the pad, the papers can be delivered piece by piece reliably.

FIGS. 24 to 36 are views illustrating the fourth embodiment of the present invention which is concerned with the structure of frame of the main device 12 (see FIGS. 1 and 2).

Figure 25:
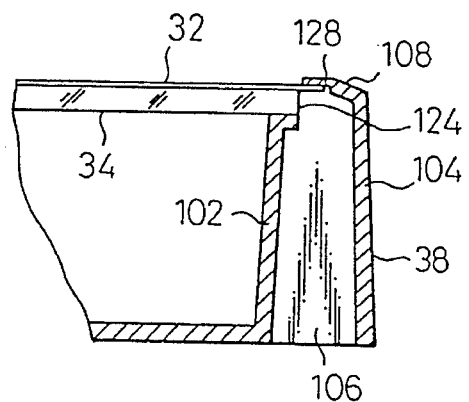
FIG. 25 is a partial sectional view of a base frame member along a line XXV—XXV of FIG. 24.
Figure 28:
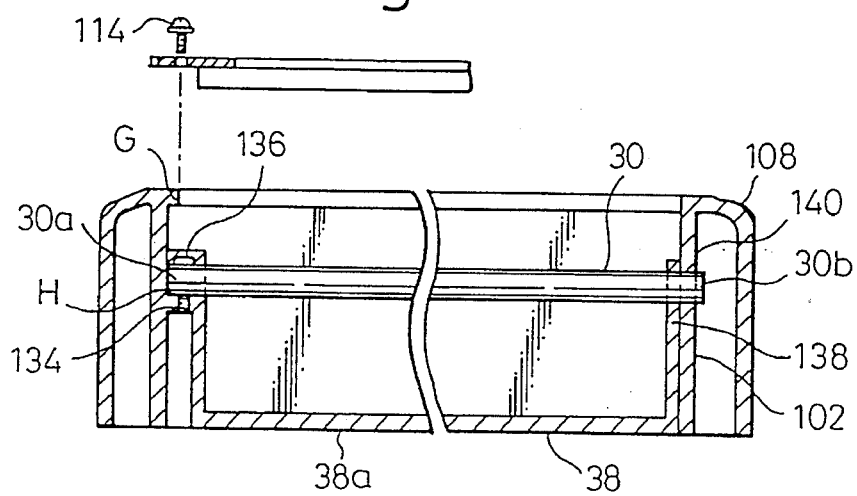
FIG. 28 is a partial cross-sectional view of the base frame member along a line XXVIII—XXVIII of FIG. 24.
Figure 31:
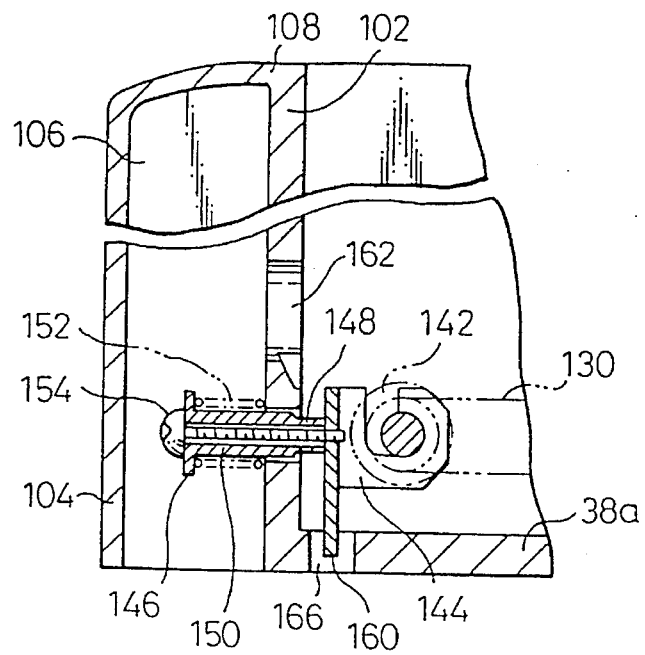
FIG. 31 is a cross-sectional view of the base frame member in which will pass a running belt of FIG. 24.
Figure 32:
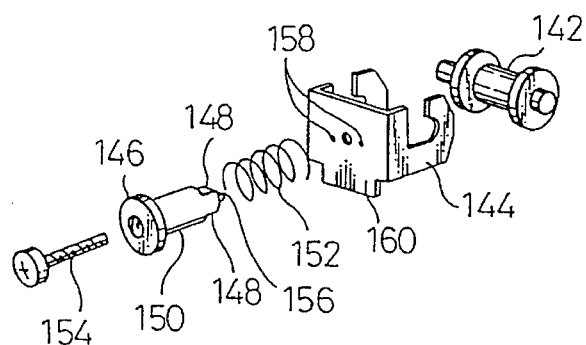
FIG. 32 is a perspective view illustrating, in a disassembled manner, a bracket and a tension rod on which is mounted an idler pulley of FIG. 31.

The structure of this frame comprises a base frame member 38 formed as a resin article such as of an ABS resin or a polycarbonate resin, and a top plate 32 made of a decorated steel plate such as a steel plate coated with a vinyl chloride. The base frame member 38 has a base 40 and an annular frame 42 consisting of side walls that nearly upwardly extend from the base 40 integrally therewith. The top plate 32 has an opening 110 and forms an outer frame of the device in combination with the base frame member 38. A glass plate 34 is mounted on the top plate 32 so as to cover the opening 110 of the top plate 32. As shown in FIGS. 25, 28 and 31, the side walls of the annular frame 42 of the base frame member 38 have a double-wall structure consisting of inner walls 102 and outer walls 104, the upper portion of space 106 between the two walls being covered with an upper plate 108 but having no bottom plate. With the space 106 being covered with upper plate 108 but having no bottom plate, the base frame member 38 exhibits good appearance and can be integrally formed by injection-molding or the like method.

Figure 24:
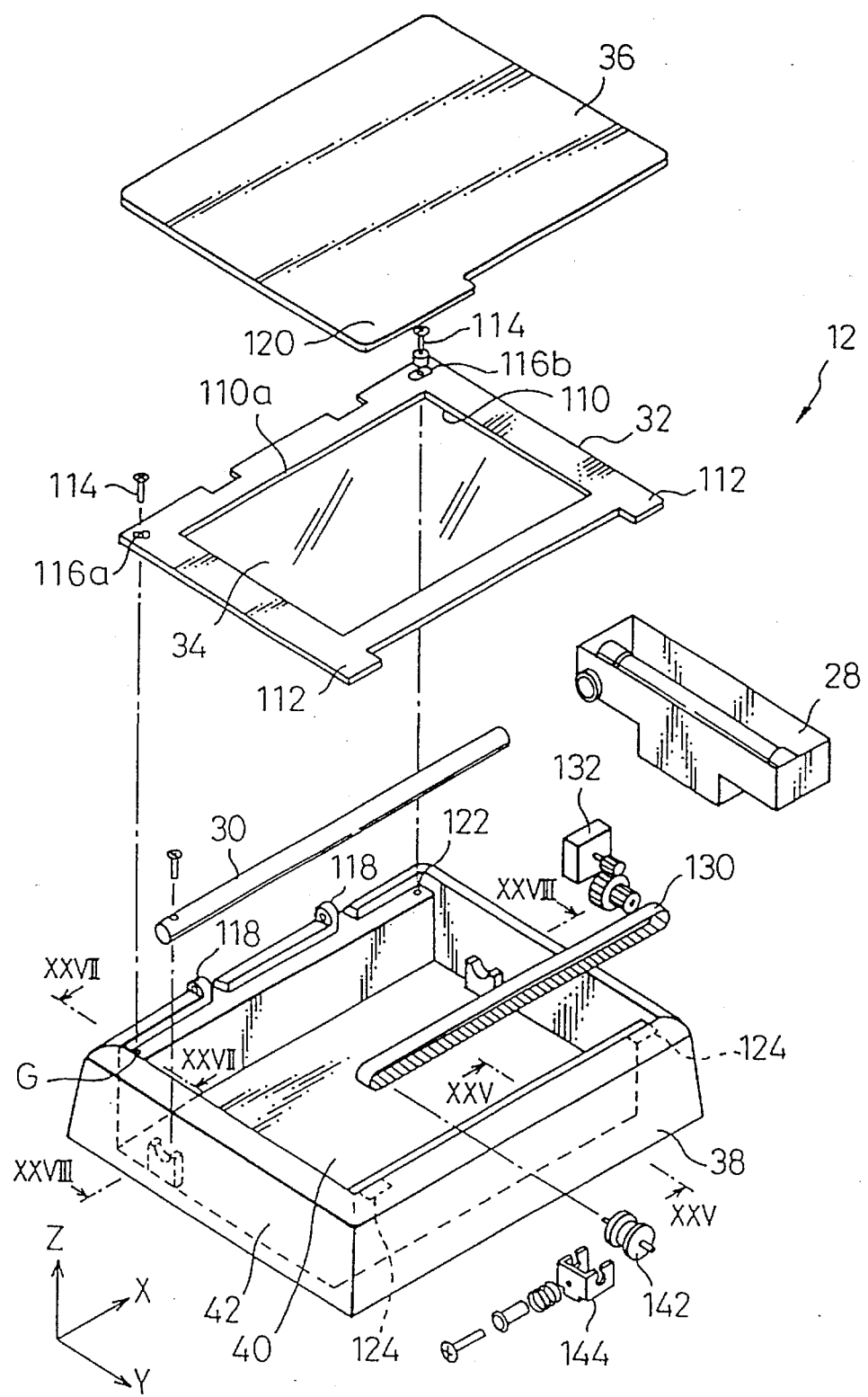
FIG. 24 is a perspective view illustrating, in a disassembled manner, the frame of the document input device according to the fourth embodiment of the present invention.

Referring to FIG. 24, at the front ends of the top plate 32 are formed insertion pieces 112 for insertion into the base frame member 38. In the back ends are formed a circular hole 116a and an elongated hole 116b for inserting screws 14 for fastening the top plate 32 to the upper surface of the base frame member 38.

A document holding cover 36 provided on the top plate 32 is mounted so that it can be opened and closed up and down by means of hinges 118 provided at the back ends of the base frame member 38. A grip 120 is formed at a front end of the document holding cover 36 so that it can be lifted up.

Figure 26:
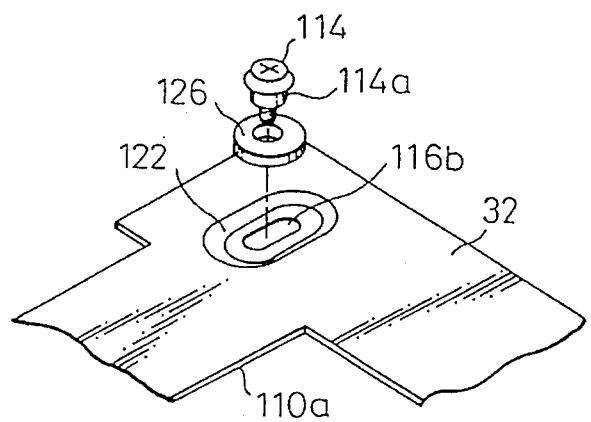
FIG. 26 is a partial perspective view of a top frame member of FIG. 24.
Figure 27:
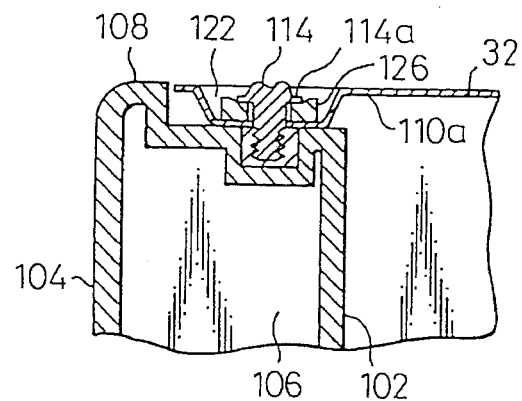
FIG. 27 is a partial cross-sectional view of the base frame member along a line XXVII—XXVII of FIG. 24.

FIGS. 25 to 27 are views partly illustrating a major portion for mounting the top plate 32. The rectangular opening 110 of the top plate 32 has an end 110a on the back side thereof that serves as a reference side. The circular hole 116a and the elongated hole 116b through which the screws are inserted to secure the top plate 32 are formed at two points on a line which is in parallel with the reference side, the elongated hole 116b being elongated in a direction in parallel with the reference side 110a (FIG. 26). In the upper surface at the back ends of the base frame member 38 are formed threaded holes 122 into which will be fitted screws 114 that are inserted in the circular hole 116a and in the elongated hole 116b.

At the upper front ends of the base frame member 38, there are formed inwardly directed slits 124 (FIG. 25) between the inner wall 102 of side wall and the upper plate 108 for receiving the insertion pieces 112. The slit 124 has a width in the up-and-down direction which is sufficient for holding the top plate 32 and the glass plate 34 which are overlapped, and the upper edge of the slit 124 is located at a position retracted from the lower edge thereof, so that the insertion piece can be inserted in the slit in a tilted manner.

The screw 114 for fastening the top plate 32 to the base frame member 38 is a stud screw, i.e., a screw with a cylindrical portion 114a (FIGS. 26 and 27) having a predetermined fit tolerance on the base side. The reference mounting point G of the top plate 32 is determined by the diameter of the cylindrical portion 114a that just fits to the circular hole 116a.

The screw 114 inserted in the elongated hole 116b has a foamed urethane washer 126 having cushioning property that fits between the head thereof and the top plate 32. The elongated hole 116b has a width which fits to the cylindrical portion 114a of the screw maintaining a predetermined fit tolerance, and whereby a position is restricted in the direction (Y-direction) at right angles with the direction (X-direction) of the reference side 110a. The insertion pieces 112 of top plate 32 are inserted in the slits 124 and the base side 110a is secured to the base frame member 38 by screws 114, forming a gap 128 between the tips of the insertion pieces 112 and the back ends of the slits 124 to absorb difference in the thermal expansion.

Owing to the above-mentioned constitution, a difference in the thermal expansion between the base frame member 38 made of a synthetic resin and the top plate 32 made of a steel is allowed to escape in both the X- and Y-directions, and whereby the top plate 32 is fastened to the upper surface of the base frame member 38 with the circular hole 116a as a reference point G in a state where the direction of its reference side 11a is defined and being allowed to undergo thermal expansion (relatively, a thermal contraction).

Referring to FIG. 24, the carrier shaft 30 is provided in the base frame member 38 in parallel with the reference side 110a of the top plate 32, and a belt 130 is arranged to drive the optical read unit 28 in parallel with the carrier shaft 30. The optical read unit 28 includes an optical member for reading the document. The optical read unit 28 is slidably guided by the carrier shaft 30 and is linked to a given point of the belt 130. The belt 130 is wrapped round a drive pulley and an idler pulley. As the motor 132 coupled to the drive pulley turns forward or reverse, the optical read unit 28 reciprocally moves along the lower surface of the glass plate 34 being guided by the carrier shaft 30. The optical read unit 28 is slidably supported by the carrier shaft 30 and by a rail that is not shown. The carrier shaft 30 is made of a metallic material and has a coefficient of thermal expansion different from that of the plastic base frame member 38. The belt 130 must be maintained in a tensioned state at all times.

Figure 29:
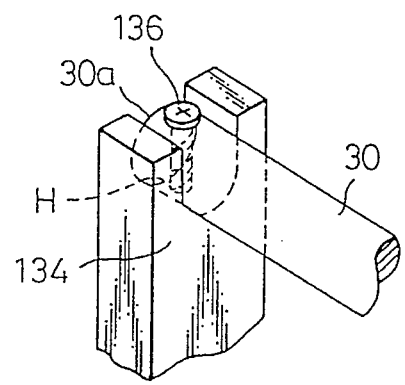
FIG. 29 is a partial perspective view illustrating an end of a carrier shaft of FIG. 28.
Figure 30:
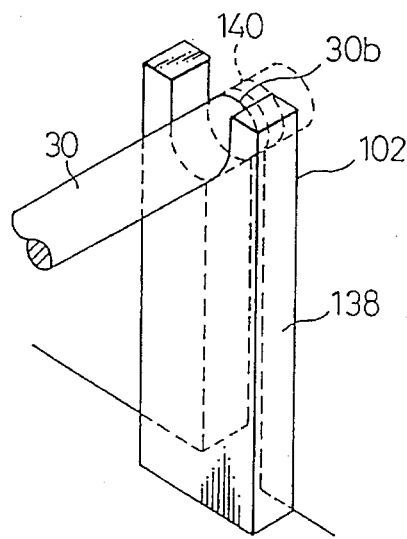
FIG. 30 is a partial perspective view illustrating the other end of the carrier shaft of FIG. 28.

FIGS. 28 to 30 illustrate a structure for securing the carrier shaft 30 to the base frame member 38. A reference end 30a of the carrier shaft 30 is secured onto a receiving plate 134 formed in the base frame member 38 by using a screw 136 that is passed therethrough from the upper direction. The other end 30b of the carrier shaft 30 is held by a receiving seat 138 that comes into contact with the lower half circle of the carrier shaft 30 and by a holder seat 140 that comes into contact with the upper half circle thereof, being allowed to move in the axial direction. The holder seat is provided being outwardly deviated beyond the receiving seat 138 (toward the end of the carrier shaft 30). The end 30b of the carrier shaft 30 penetrates through the inner wall 102 between the receiving seat 138 and the holder seat 140.

The end 30b of the carrier shaft 30 is aslantly inserted in the base frame member 38 and is inserted into between the receiving seat 138 and the holder seat 140. The carrier shaft 30 is then brought to a horizontal direction and its reference end 30a is placed on the receiving plate 134. The reference end 30a is then fastened to the receiving plate 134 using a screw 136 which penetrates through the carrier shaft 30 in a direction at right angles. The position H at which the reference end 30a is fastened by screw is located just under the reference mounting point G of the top plate 32 on an extension in the Y-direction, so that there will be no deviation in position between G and H in the X-direction. Accordingly, precision of reference position (home position) in the X-direction of the optical read unit 28 in relation to the top plate 34 and precision of running direction are guaranteed for all temperature conditions irrespective of difference in the thermal expansion among the base frame member 38, top plate 32 and carrier shaft 30. Moreover, the carrier shaft 30 can be easily fitted into the base frame member 38, and the fastening positions are not exposed to the outside of the frame.

FIGS. 31 to 36 are views illustrating a structure for mounting the idler pulley 142 for the belt 130. The idler pulley 142 is rotatingly fitted by shaft to a support bracket 144 which has a U-shape in a plan view. The support bracket 144 is mounted on the base frame member 38 in a state of being so urged as to give tension to the running belt 130.

Figure 33:
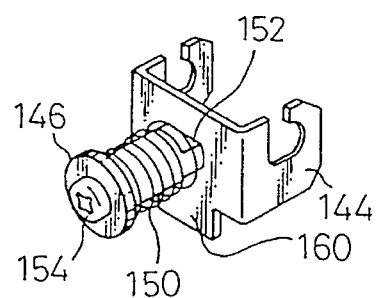
FIG. 33 is a perspective view illustrating a bracket and a tension rod of FIG. 32 in an assembled state.

On the back surface of the support bracket 35 is mounted a tension rod 150 that has a flange 146 and parallel grooves 148 at both ends thereof. The compression coil spring 152 is disposed about the tension rod 150 which is secured by a screw 154 to the support bracket 35 (FIG. 33). A turn-stop protuberance 156 is provided at a position where the support bracket 144 is secured to the tension rod 150, and a hole 158 is formed in the tension rod 150 to come into engagement with the protuberance 156. Parallel grooves 148 of the tension rod 150 are held in a direction in parallel with the axis of the idler pulley 142. A turn-stop protuberance 160 is formed at a lower end of the support bracket 144.

Figure 34:
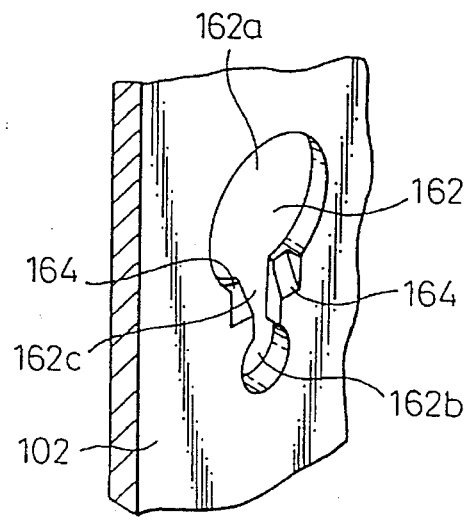
FIG. 34 is a perspective view illustrating a potbelly hole in which will be inserted a tension rod of FIG. 31.
Figure 35:
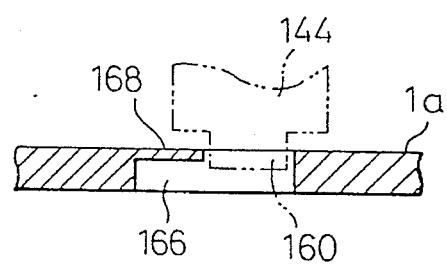
FIG. 35 is a cross-sectional view illustrating a turn-stop piece of the bracket and a turn-stop hole of the base frame member of FIG. 33.

Referring to FIG. 34, a potbelly hole 162 is formed in the inner wall 102 of the base frame member 38. The potbelly hole 162 consists of an upper large-diameter hole 162a and a lower small-diameter hole 162b that are linked together by a squeezed passage 162c, and penetrates through the inner wall 102. Both sides of the squeezed passage 162c are tapered as designated at 164, so that the thickness decreases toward the large-diameter hole 162a. The large-diameter hole 162a has a diameter that permits the insertion of the flange 146 of the tension rod 150, and the small-diameter hole 162b has a diameter that slidably fits to the tension rod 150. The squeezed passage 162c has a width which permits the passage of the bottom of the parallel grooves 148. In a bottom portion 1a of the base frame member 38 just under the potbelly hole 162 is formed a turn-stop hole 166 in which will be inserted the turn-stop protuberance 160 of the support bracket. A resilient tongue piece 168 (FIG. 35) having a reduced thickness extends into the turn-stop hole 166 from a side direction.

The flange 146 is inserted in the large-diameter hole 162a of the potbelly hole 162 in a state where the support bracket 144 of idler pulley 142 mounting the tension rod 150 as shown in FIG. 33 is turned by 90 degrees about the tension rod 150 from its normally mounted state (state in which the roller shaft is horizontal), and the parallel grooves 148 are passed through the squeezed passage 162c in a manner that the side end of the compression coil spring 152 on the side of the support bracket is pushed to the outside of the inner wall 102. In this case, the tapered surfaces 164 on both sides of the squeezed passage help pass the tension rod 150 through the squeezed passage 162c while compressing the compression coil spring 152 onto the outer surface of the inner wall 102. After the tension rod 150 has arrived at the small-diameter portion 162b, the bracket 144 is turned by 90 degrees about the axis of the tension rod 150 into a normal state. In this case, the turn-stop protuberance 160 of the bracket 144 turns downwardly from the side direction and downwardly bends the resilient tongue piece 168 and enters into the turn-stop hole 166. Thereafter, the resilient tongue piece 168 returns back and holds the side of the turn-stop protuberance 160. Then, the support bracket 144 is prevented from turning about the tension rod 150. The tension rod 150 is prevented, either, from upwardly escaping passing through the squeezed passage 162c. The tension rod 150 is slidable in the axial direction along the small-diameter hole 162b of potbelly hole 162 and, hence, the bracket 144 is mounted on the base frame member in a state of being so urged by the compression coil spring 152 as to give tension to the running belt 130 at all times. The mounting portion is not exposed to the outside of the base frame member 38.

Figure 36:
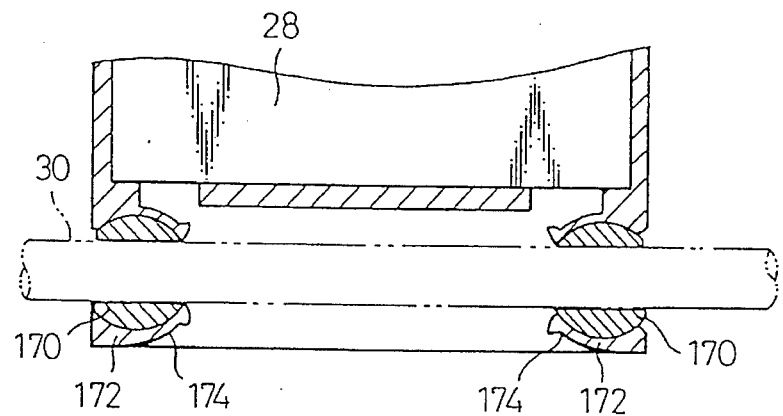
FIG. 36 is a cross-sectional view through which the carrier shaft passes.

FIG. 36 illustrates the structure of a portion where the optical reading unit 28 and the carrier shaft 30 are fitted together. The optical reading unit 28 is slidably fitted to the carrier shaft 30 via two spherical sliders 170 to slide in the axial direction thereof. The two spherical sliders 170 are fitted with their spherical outer peripheries into semi-spherical receiving recesses 172 that have an opening in the bottom portions thereof for inserting the carrier shaft 30, and are held by a plurality of elastic protrusions 174 that extend from the edges of the semi-circular recesses 172 in a manner to wrap the outer peripheries of the spherical sliders 170. The spherical sliders 170 are fitted into the receiving recesses 172 by expanding the elastic protrusions 174. Owing to the structure shown in FIG. 36, coaxial error due to thermal deformation or the like is eliminated, and the optical read unit 28 is guided maintaining less gap between the carrier shaft 30 and the spherical sliders 170, i.e., maintaining a high precision as described earlier.

Figure 37:
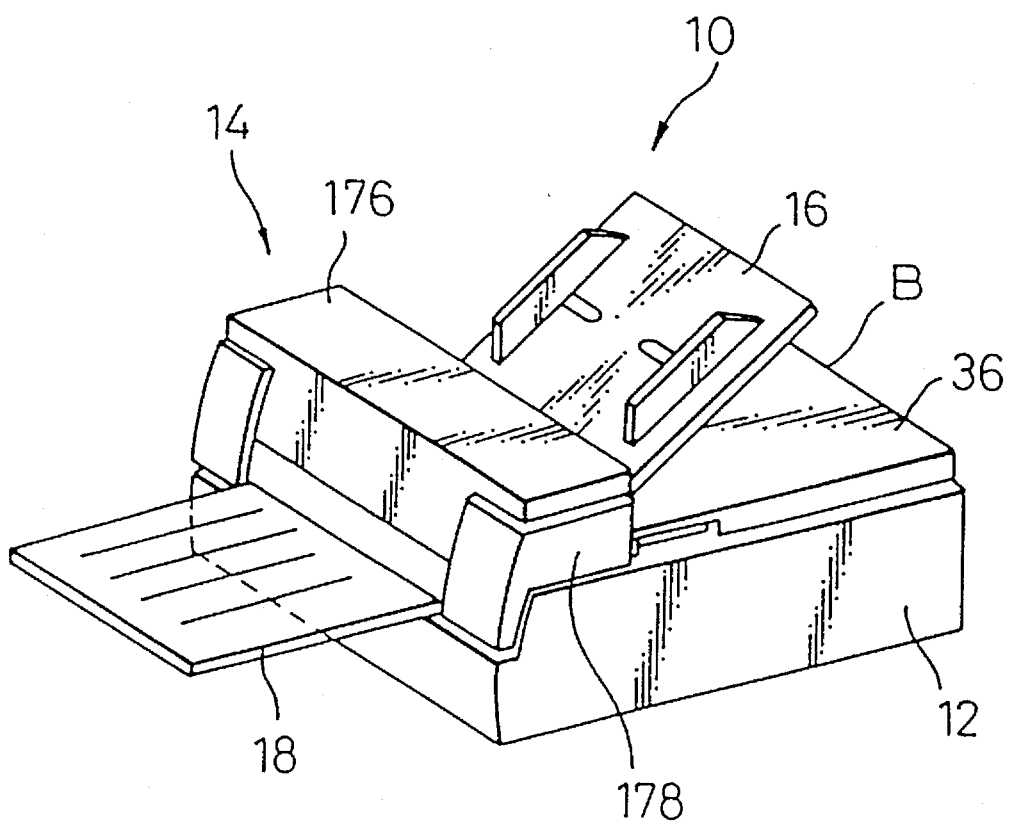
FIG. 37 is a perspective view illustrating the document input device according to the fifth embodiment of the present invention.
Figure 38:
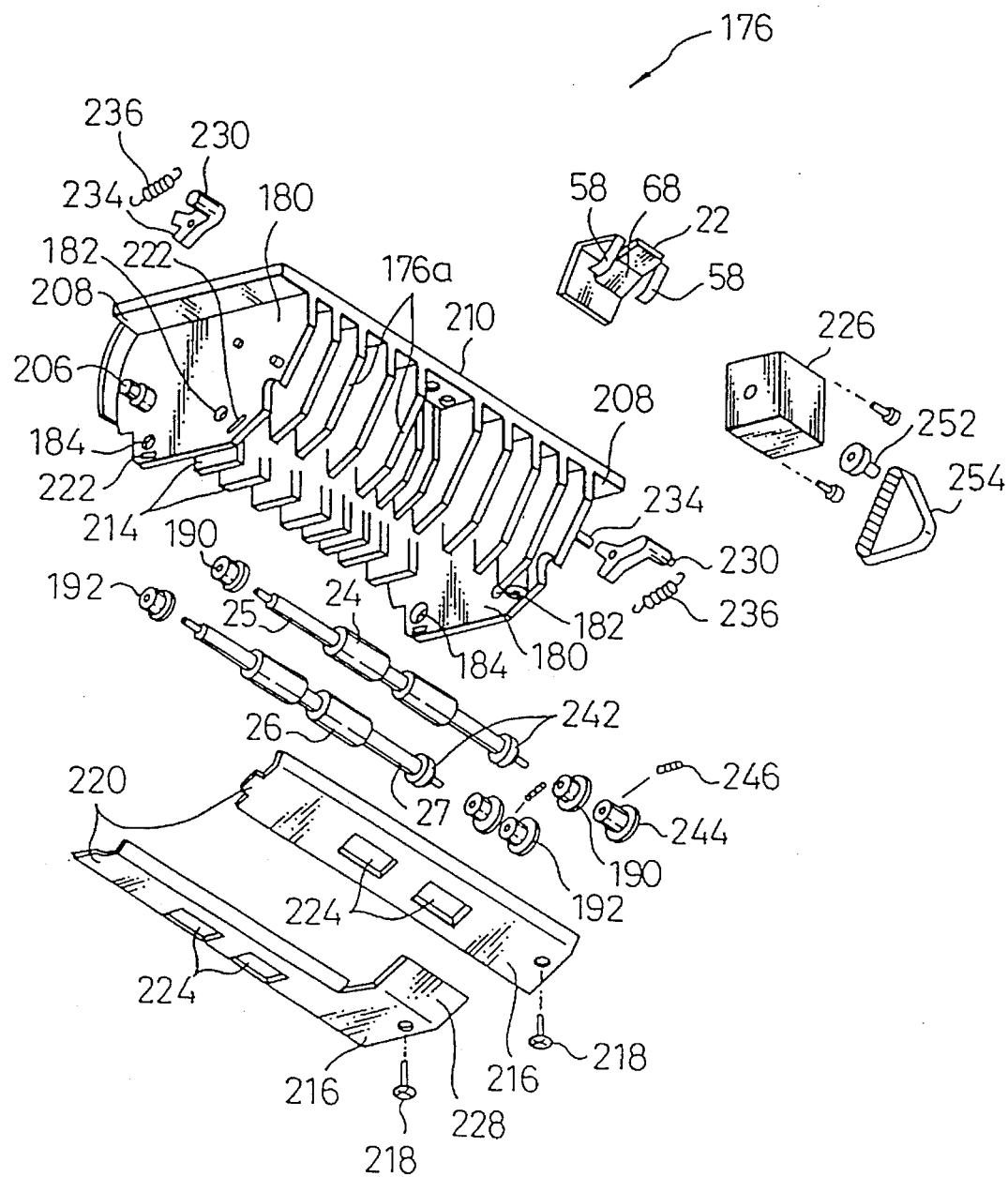
FIG. 38 is a perspective view illustrating, in a disassembled manner, an upper frame of the housing of the automatic paper feeder of FIG. 37.
Figure 39:
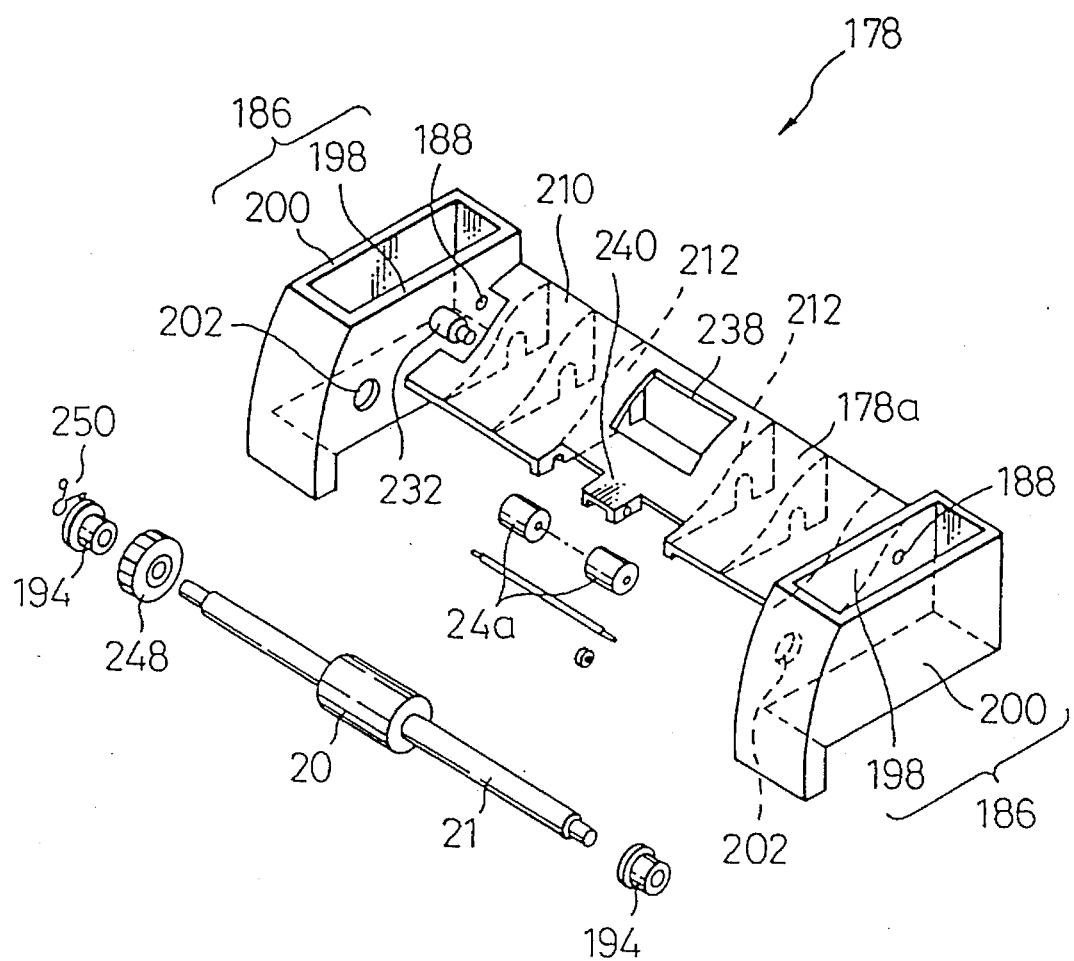
FIG. 39 is a perspective view illustrating, in a disassembled manner, a lower frame of the housing of the automatic paper feeder of FIG. 37.

FIGS. 37 to 39 are views illustrating the fifth embodiment of the present invention. The document input device 10 has the main device 12 and the automatic paper feeder 14. The housing of the automatic paper feeder 14 is divided into an upper frame 176 and a lower frame 178 with the paper passage as a boundary, the two frames 176 and 178 being molded as plastic molded articles. FIG. 38 illustrates the upper frame 176 and FIG. 39 illustrates the lower frame 178.

The upper and lower frames 176 and 178 are injection-molded, and have paper guide surfaces 176a, 178a formed integrally together. Holes 182 and 184 are formed in the side wall 180 of the upper frame 176, and bearings 190 and 192 are fitted to these holes 182, 184. The roller shafts 25, 27 of the feed rollers 24, 26 are supported by the upper frame 176 via these bearings 190 and 192. Furthermore, holes 188 are formed in the side wall 186 of the lower frame 178, an bearings 194 are fitted to the holes 188. The roller shaft 21 of the pick roller 20 is supported by the lower frame 178 via bearings 194.

The side wall 186 of the lower frame 178 has a double-wall structure consisting of an inner side plate 198 and an outer side plate 200. The side wall 186 upwardly protrudes from the upper surface of the lower frame 178 that serves as a paper guide surface and has a pivot hole 202 formed in the inner side plate 198 to pivotally support the upper frame 176. The side wall 180 of the upper frame 176 fits to inside the inner side plate 198 of the lower frame 178. The upper side plate 180 has, formed integrally therewith, a fulcrum shaft 206 that outwardly protrudes so as to be fitted into the pivot hole 202 in the lower frame 178, whereby the upper frame 176 is allowed to swing open and close relative to the lower frame 178 with the fulcrum shaft 206 as a center. The fulcrum shaft 206 can be snap-fitted to the pivot hole 202 owing to resilient deflection of the plastic upper side plate 180 and the plastic inner side plate 198.

At the upper end of the upper frame 176 is formed a flange 208 sidewardly protruding from the upper side plate 180. The flange 208 closes the upper side of space formed between the inner side plate 198 and the outer side plate 200 of the lower frame 178.

Side walls 186 on both sides of the lower frame 178 are coupled together by an upper panel plate 210 that is tilted in the direction in which the paper is conveyed on the side of inserting the paper. The upper panel plate 210 is forming a paper guide surface 17a that serves as the lower surface of the paper passage. On the lower side of the upper panel plate 210 are integrally formed reinforcing ribs 212 that extend in parallel with the side walls 186 and in the form of comb teeth. The presence of the reinforcing ribs 212 permits the upper panel plate 210 to be resiliently deflected in the direction of width of the paper yet maintaining high rigidity and highly accurate shape in the direction in which the paper is conveyed. Nip rollers 24a of the pick roller 24 are pushed onto the pick roller 20 due to resilient deflection of the upper panel plate 210 in the direction of width of the paper.

The upper side plates 180 on both sides of the upper frame 176 are coupled together by the upper panel plate 210 that serves as an upper surface of the housing of the automatic paper feeder, and reinforcing ribs 214 are formed like comb teeth under the upper panel plate 210 to extend in parallel with the upper side plates 180. The ends of a plurality of parallel reinforcing ribs 214 are forming an upper paper guide surface 176a of the paper passage.

The upper paper guide surface 176a of the paper passage is roughly formed by the ends of comb teeth-shaped reinforcing ribs 214. Strip-like metallic paper guides 216 are provided near the feed rollers 24, 26 in order to reliably prevent the ends of papers from being folded. The paper guides 216 are held at their both ends by the upper side plates 180 of the upper frame 176, and come into contact with the ends of the comb teeth-shaped reinforcing ribs 214 to prevent the central portions thereof from deflecting.

The metallic paper guides 216 are fastened at the ends on one side in the lengthwise direction thereof to the ends of the upper side plate 180 by screws 218. Tongue pieces 220 are protruded from the ends on the other side of the paper guides 216, and slits 222 in which will be inserted the tongue pieces 220 are formed in the upper side plate 180 of the same side. The slits 222 and the tongue pieces 220 are fitted together maintaining a gap enabling the paper guides 216 to move to some extent in the lengthwise direction thereof (direction of width of the paper), a difference in the thermal expansion between the metallic paper guides 216 and the plastic upper frame 176 is absorbed by a relative movement of the slits 222 and tongue pieces 220, so that the metallic paper guides 216 will not be deflected by a difference in the thermal expansion.

The paper guides 216 are provided at positions where the feed rollers 24, 26 are provided, and have openings 224 through which the feed rollers 24, 26 are exposed. Furthermore, a motor 226 for driving the feed rollers is contained in space that is formed in the upper frame 176 by partly cutting away the comb teeth-shaped reinforcing ribs 214. For this purpose, one paper guide 216 has a cover 228 formed integrally to cover space in which the motor is held.

The upper frame 176 that is closed is held in this closed state due to the engagement of an engaging lever 230 mounted on the outside of the upper side plate 180 of the upper frame 176 and an engaging pin 232 that is inwardly protruded from the inner side plate 198 of the lower frame 178. The engaging lever 230 has a Y-shaped receiving portion 234 at its tip portion, and the receiving portion 234 is pivotally supported by the upper side plate 7 so as to swing in the up-and-down direction. A pulling spring 236 is hooked between the base end of the engaging lever 230 and the upper side plate 180, and the engaging lever 230 performs a flip-flop swinging motion due to a positional relationship between the urging direction of the spring 236 and the center of swing of the engaging lever 230. When the upper frame 176 is closed, the engaging lever 230 swings in a direction to push the upper frame 176 onto the lower frame 178, and the upper frame 176 is maintained in the closed state due to the urging force of the pulling spring 236.

The pick roller 20 is arranged on the back side of the upper panel plate 210 of the lower frame 178, and the upper panel plate 210 of the lower frame 178 has an opening 238 through which the pick roller 20 is exposed. The nip rollers 24a of pick roller 20 are supported using a shaft by a U-shaped bracket 240 formed at the center of the upper panel plate 210 of the lower frame 178. Due to resilient deflection of the upper panel plate 210 of the plastic lower frame 178, the nip rollers 24a are urged toward the pick roller 20 to hold the paper. The urging force can be adjusted depending upon the thickness of the upper panel plate 210 of the lower frame 178 and the shape of the reinforcing ribs 212 formed on the back surface thereof.

Stop rings 242 such as C-clips are fitted to the ends on one side of the roller shafts 25, 26 of the feed rollers 24, 25 mounted on the upper frame 176, and a belt pulley 244 is fastened to an end thereof using a stop screw 246. Bearings 190, 192 of this side are sandwiched by the stop wheel 242 and the belt pulley 244 in the axial direction, and the bearings 109, 192 and the roller shafts 25, 26 are prevented from moving relative to each other in the axial direction. The ends on the other side of the roller shafts 25, 26 are supported by bearings 190 and 192 fitted to holes 182, 184 of the upper side plate 180 being allowed to move to some extent in the axial direction. This movement absorbs a difference in the thermal expansion between the plastic upper frame 176 and the metallic roller shafts 25, 26.

The roller shaft 21 of the pick roller 20 has the same structure and absorbs a difference in the thermal expansion between the plastic lower frame 178 and the metallic pick roller shaft 21. That is, an end of the pick roller shaft 21 holds the bearing 194 in the axial direction between a gear 248 for driving the pick roller and a C-clip 250 at the end of the shaft while inhibiting the relative motion between the bearing 194 and the roller shaft 21 in the axial direction, and the other end is held by a bearing 194 being allowed to move to some extent in the axial direction.

A timing belt 254 is wrapped round between the belt pulleys 244 fitted to the ends of the roller shafts 25, 26 of the drive side of the feed rollers and the belt pulley 252 fitted to the output shaft of the motor 226. The belt pulleys 244, 252 and the timing belt 254 are located in space defined between the upper side plate 180 and the inner side plate 198 of the lower frame 178 in a state where the upper frame 176 is closed, and the mechanical portion does not at all appear to the outside of the device. When the upper frame 176 is opened, the mechanical portion can be easily checked for maintenance. In the drawing, the timing belt 254 is drawn in a triangular shape, since two feed rollers 24 and 26 are driven in synchronism by a single motor 226.

Space for holding the separator pads 68 is formed at a central portion at the end of the upper frame 176 by partly cutting away the reinforcing ribs 214. The separator pads 68 are secured at their upper sides to the metallic bracket and are urged by springs that are not shown toward the pick roller 20. Strip-like pick springs 58 made of a thin spring plate are secured at their upper side to the bracket on both sides of the separator pads 68. The pick springs 58 and separator pads 68 may have structures as described in the above-mentioned embodiment.

Figure 40:
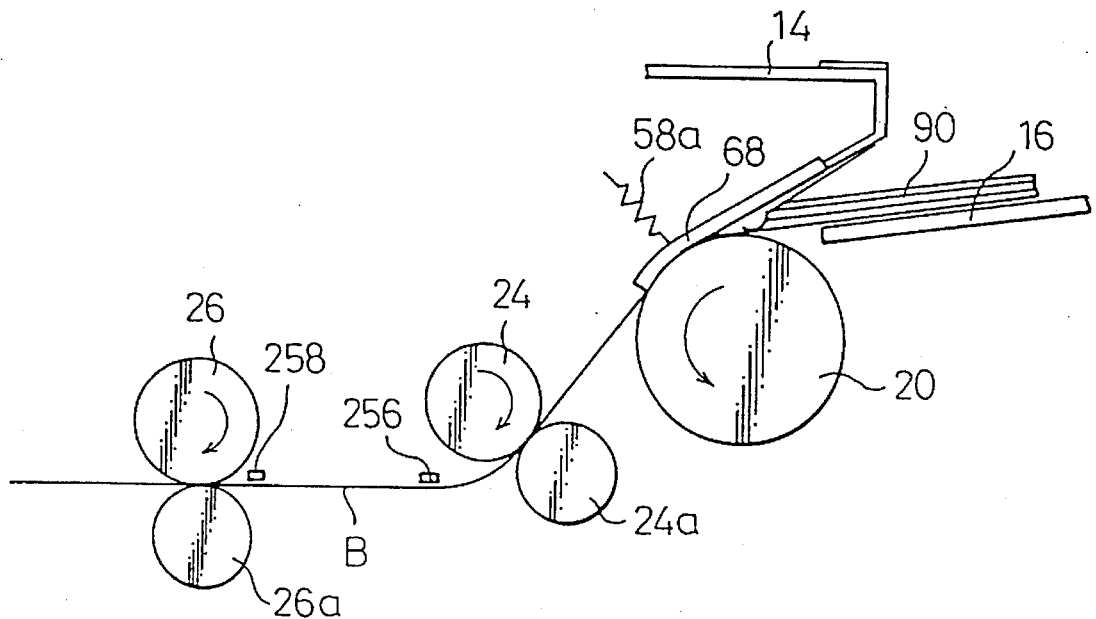
FIG. 40 is a view schematically illustrating pick rollers and feed rollers in the automatic paper feeder according to the sixth embodiment of the present invention.

FIGS. 40 to 43 are views illustrating the sixth embodiment of the present invention. In this embodiment, the pick roller 20 and the feed rollers 24, 26 are driven in synchronism by a single motor 226. The pick roller 20 and the feed rollers 24, 26 are arranged along the paper passage as shown in FIG. 40. The pick spring 58a and the separator pad 28 are in contact with the peripheral surface of the pick roller 20 to push the lower surface at the leading end of the paper 90 stacked on the paper-feed tray 16 onto the pick roller 20 to take it out.

The first feed roller 24 cooperates together with the nip roller 24a, and the second feed roller 26 cooperates together with the nip roller 26a. The paper processing portion (e.g., data read portion) B is located between the first feed roller 24 and the second feed roller 26, and the paper is fed by the first feed roller 24 to the processing portion B and is further fed by the second feed roller 26. A sensor 256 is provided near the first feed roller 24 on the go-out side thereof to detect the timing at which the paper is fed to the processing portion B, and a sensor 258 is provided near the second feed roller 26 on the come-in side thereof to control the timing of stamping operation of this embodiment.

Figure 41:
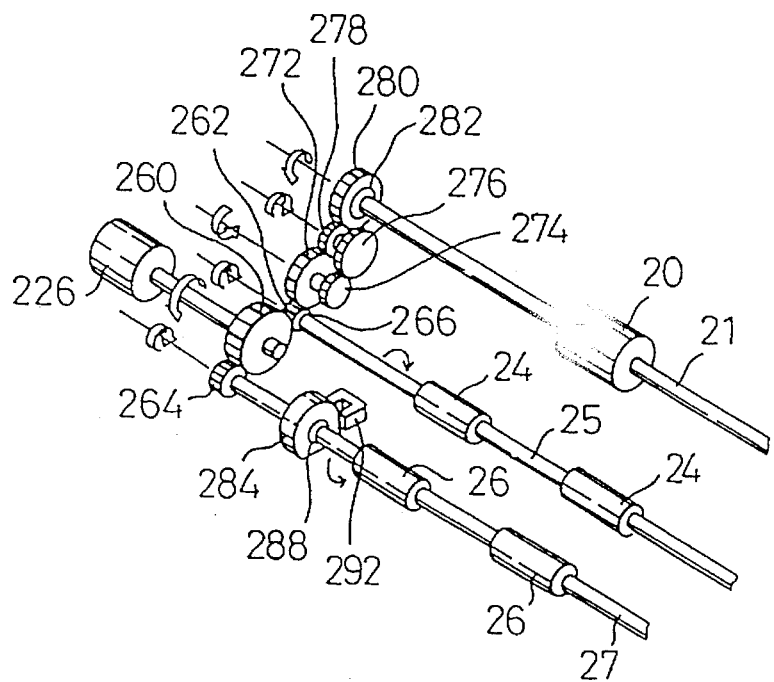
FIG. 41 is a perspective view illustrating pick rollers, feed rollers and a stamp drum of FIG. 40.

Referring to FIG. 41, the rotation of the motor 226 is transmitted to the first feed roller 24 via gears 260 and 262, and is further transmitted to the second feed roller 26 via gears 260 and 264. Here, the gear 260 is secured to the motor shaft, the gear 262 is fitted to the roller shaft 25 of the first feed roller 24 via a one-way clutch 266, and the gear 264 is secured to the roller shaft 27 of the second feed roller 26. Moreover, the rotation of the motor 226 is transmitted to the gear 23 that is fitted via a one-way clutch 282 to the roller shaft 21 of the pick roller 20 from the gear 262 fitted to the roller shaft 25 of the first feed roller 24 via intermediate gears 272 to 278. Owing to this constitution, therefore, when the motor 226 is rotated forward, the pick roller 20 and the first and second feed rollers 24, 26 rotate in synchronism in a direction in which the paper is conveyed shown in FIG. 40. When the motor 226 is reversely rotated, the pick roller 20 and the first feed roller 24 come into halt due to the action for preventing reverse rotation of the one-way clutches 25, 35, whereby the second feed roller 26 only rotates in the direction opposite to the direction of conveying the paper. Therefore, the paper is once fed back.

A semicircular stamp drum 284 (FIG. 42) having a cut-away portion 286 in a portion of the circumference thereof is fitted, via a one-way clutch 288, to the roller shaft 27 of the second feed roller 26. When the roller shaft 27 of the second feed roller 26 is rotated in the direction of conveying the paper, the one-way clutch 288 does not transmit its rotation to the stamp drum 284. When the roller shaft 27 of the second feed roller 26 is rotated in the reverse direction, the one-way clutch 288 transmits the rotation to the stamp drum 284. An arcuate stamp surface 290 is formed in a protruded manner on a portion on the peripheral surface of the stamp drum 284. Referring to FIG. 43, the stamp drum 284 has a diameter slightly smaller than the diameter of the second feed roller 26, and the stamp surface 290 has a diameter slightly larger than the diameter of the second feed roller 26. When the stamp drum 284 is rotated, therefore, the peripheral surface of the stamp drum 284 does not come into contact with the surface of the paper, but the stamp surface 290 comes into contact with the surface of the paper and rotates. The stamp surface 290 is formed on the surface of a base material that undergoes compressive deformation such as a rubber sheet.

A sensor bracket 292 having a U-shape in a plane is secured to a stationary member that is not shown in a manner to be faced to the end surface of the stamp drum 284. A photoelectric sensor 294 attached to the sensor bracket 292 detects the cut-away portion 286 when the stamp drum 284 is rotated. An engaging piece 296 is secured to a portion on the end surface of the stamp drum 284 and comes into contact with the sensor bracket 292 to prevent the one-way clutch 288 from being rotated by friction in its free direction. That is, the position at which the engaging piece 296 comes into contact with the sensor bracket 292 is a standby position of the stamp drum 284.

As the motor 226 rotates forward, the pick roller 20 and the feed rollers 24, 26 are rotated in the direction of feeding the paper. Among the papers stacked on the paper-feed tray 16, the lowermost piece is separated by the action of the pick roller 20 that is rotating and by the action of pick springs 58a and separator pads 68 that are in contact therewith. The paper is then fed into between the first feed roller 24 and the nip roller 25. As the paper is further fed by the first feed roller 24, the leading end of the paper is detected by the sensor 256 and, thereafter, rotational angle pulses of the motor 226 are counted, and the paper is read in a state where a correct position of the paper is detected at the processing portion B. The distance between the first feed roller 24 and the second feed roller 26 is smaller than the length of the paper. Therefore, through most of its section, the paper is conveyed in a state of being held by the first and second feed rollers 24 and 26.

The trailing end of the paper that has passed through the processing portion B is detected by the sensor 258, and the motor 226 is once stopped and is then rotated reverse. Rotation of the motor 226 in the reverse direction is transmitted to the second feed roller 26 only and the paper that is processed being held thereby is sent back. At the same time, the one-way clutch 288 is locked, whereby the stamp drum 284 is rotated in synchronism with the second feed roller 26, and a mark of the stamp surface 290 is stamped on the surface of the paper 90 that is being sent back. Next, the motor 226 is rotated again forward, the paper 90 on which the mark is stamped is sent out by the second feed roller 26, and the subsequent paper is fed to the processing portion B by the pick roller 20 and the first feed roller 24. In FIG. 41, open arrows indicate rotating directions of the shafts of when the motor 226 is rotated forward, and narrow arrows indicate the directions in which the clutches are locked.

Figure 44:
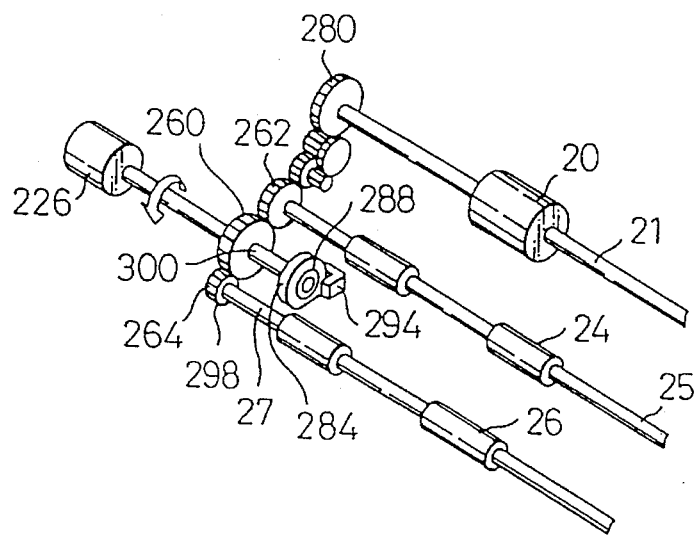
FIG. 44 is a view illustrating a modified example the automatic paper feeder having the stamp drum.

FIG. 44 illustrates a modified example having a stamp drum 284. In this example, the gear 264 is attached to the roller shaft 27 of the second feed roller 26 via a one-way clutch 298, and is brought into engagement with the gear 260 attached to the motor shaft. Therefore, the second feed roller 26 rotates in the forward direction only irrespective of the direction of rotation of the motor 226. The stamp drum 284 is fitted to a stamp shaft 300 which is substantially the same as the output shaft of the motor 226 via a one-way clutch 288. The constitution in other respects is the same as that of FIG. 41.

In this example, the operation of the motor 226 when it is rotating forward is the same as that of the above-mentioned embodiment. When the motor 226 is reversely rotated, the second feed roller 26 ceases to rotate due to the action of the one-way clutch 298, and the stamp drum 284 only rotates. In this case, the stamp drum 284 is rotated in a direction in which the paper that is in contact therewith is conveyed. As the stamp drum 284 rotates and the stamp surface 290 comes into contact with the surface of the paper that is at rest, the paper is fed being held by the second feed roller 26 which is in a state of being freely rotated due to the frictional drive force which the paper receives from the stamp surface 290, and a mark indicating "processed" is printed on the surface of the paper. Thereafter, the motor 226 is rotated again, so that the paper that is processed is sent out and a subsequent paper is fed into the processing portion.

Figure 45:
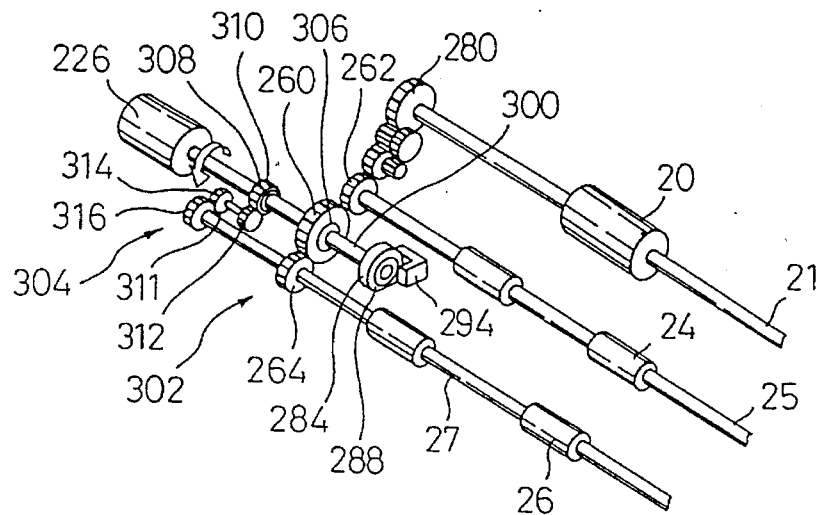
FIG. 45 is a diagram illustrating a further modified example of the automatic paper feeder having the stamp drum.

FIG. 45 illustrates a modified example having the stamp drum 284. In this example, provision is made of a forward rotation transmission device 302 and a reverse rotation transmission device 304 between the motor shaft and the roller shaft 27 of the second feed roller 26. The forward rotation transmission device 302 is constituted by two gears 260 and 264 in the same manner as the above-mentioned embodiment, and a one-way clutch 306 is interposed between the gear 260 on the side of the motor shaft and the motor shaft. When the motor 226 rotates forward, the forward rotation transmission clutch 306 is locked to transmit the rotation to the roller shaft 27 of the second feed roller 26.

The reverse rotation transmission device 304 is constituted by a gear 310 fitted to the motor shaft via a one-way clutch 308, gears 312 and 314 which are substantially integrally fitted to an intermediate shaft 311, and a gear 316 secured to the roller shaft 27 of the second feed roller 26. Due to the presence of the intermediate gears 312 and 314 in the reverse rotation transmission device 304, the direction of rotation transmitted to the roller shaft 27 of the second feed roller 26 becomes opposite to the direction of rotation that is transmitted through the forward rotation transmission device 302. The reverse rotation transmission clutch 308 is locked when the motor 226 rotates reverse and transmits the rotation of the motor shaft to the roller shaft 27 of the second feed roller 26. The stamp drum 284 is fitted to the stamp shaft 300 which is substantially the same as the motor shaft via a one-way clutch 288 in the same manner as the stamp drum of the above-mentioned embodiment.

When the motor 226 is rotated forward, the forward rotation transmission clutch 306 is locked, and the reverse rotation transmission clutch 308 and the one-way clutch 288 of the stamp drum 284 are set to be free, so that the paper is conveyed. When the rotor 226 rotates reversely, the forward rotation transmission clutch 306 is set to be free, the reverse rotation transmission clutch 308 and the one-way clutch 288 of the stamp drum 284 are locked, causing the roller 27 of the second feed roller 26 to be rotated in the direction of conveying the paper which is the same as when the motor is rotated forward. At the same time, the stamp drum 284 rotates in the direction of conveying the paper and as the stamp surface 290 comes into contact with the surface of the paper, a mark indicating "processed" is printed on the surface of the paper that is fed by the second feed roller 26. At this moment, the pick roller 20 and the first feed roller 24 are at rest. Then, the motor 226 is rotated again forward, so that the second feed roller 26 continues to rotate in the same direction, and the pick roller 20 and the first feed roller 24 rotate again.

Figure 42:
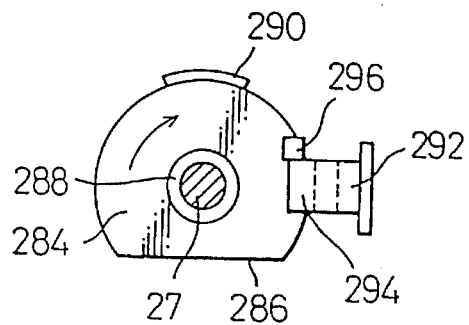
FIG. 42 is a front view of the stamp drum of FIG. 41.
Figure 43:
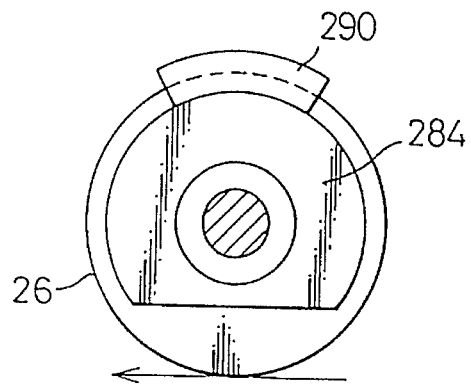
FIG. 43 is a front view illustrating, on an enlarged scale, the stamp drum and the feed roller of FIGS. 42.
Figure 46:
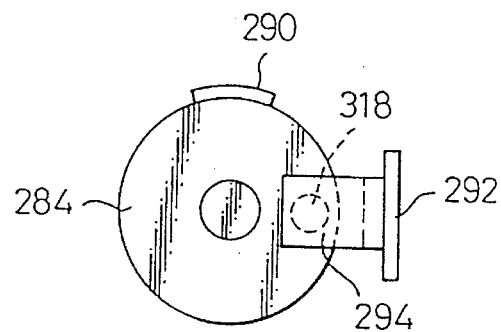
FIG. 46 is a diagram illustrating a modified example of the stamp drum.

In the above-mentioned embodiment, the stamp drum 284 is a semi-circular drum as shown in FIGS. 42 and 43. As shown in FIG. 46, however, the stamp drum 284 may be a circular drum having a through hole 318 instead of a semi-circular drum. The sensor bracket 292 is provided with a photoelectric sensor 294 for detecting the passage of the stamp drum 284 across the through hole 318 as it rotates, and standby or rotation of the stamp surface 290 is detected relying upon a detect signal of the photoelectric sensor.

Figure 47:
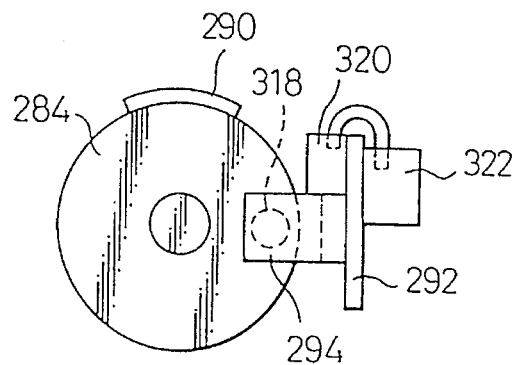
FIG. 47 is a diagram illustrating a further modified example of the stamp drum.
Figure 48:
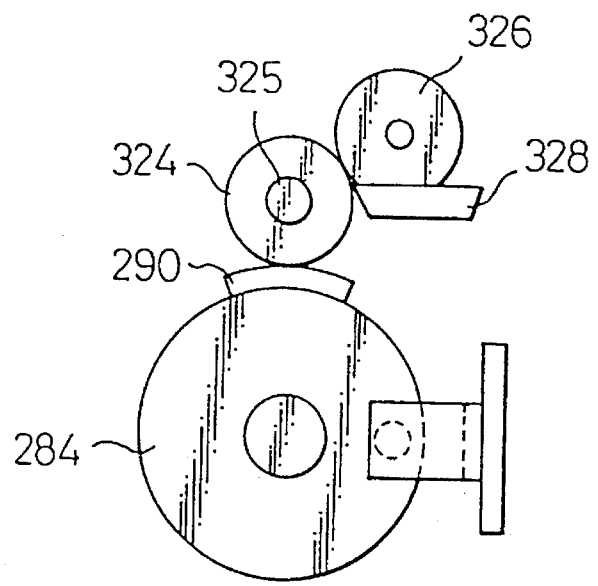
FIG. 48 is a diagram illustrating a still further modified example of the stamp drum.

Referring to FIGS. 47 and 48, furthermore, a device may be provided to feed an ink to the stamp surface 290 of the stamp drum 284. Referring to FIG. 47, a sponge 320 impregnated with an ink is disposed at a position through which the stamp surface 290 passes as the stamp drum 284 rotates, and an ink reservoir 322 is provided to feed the ink to the sponge 320 at all times relying upon the capillarity.

In the structure of FIG. 48, an ink roller 324 freely rotates about a shaft 325 in contact with the stamp surface 290 accompanying the rotation of the stamp drum 284, an ink feed roller 326 which is immersed at its lower peripheral end in the ink in an ink reservoir 328 is brought into contact with the peripheral surface of the ink roller 324, so that the ink in the ink reservoir 328 is transferred to the stamp surface 290 accompanying the rotation of the ink roller 324 that turns following the stamp drum 284 and accompanying the rotation of the ink feed roller 326.

Figure 49:
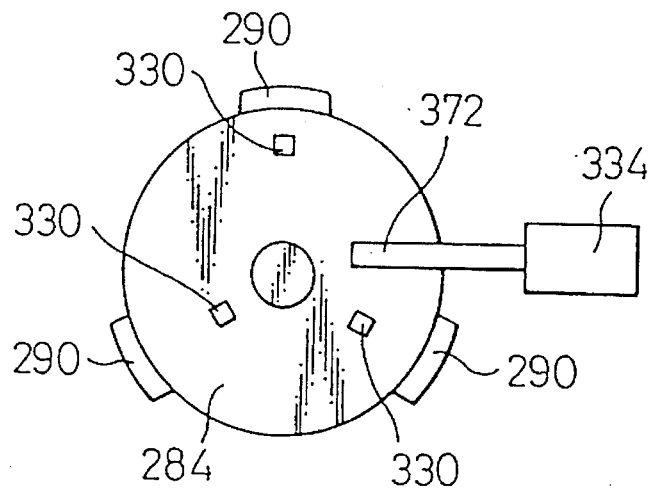
FIG. 49 is a diagram illustrating a yet further modified example of the stamp drum.

FIG. 49 illustrates an example in which three stamp surfaces 290 are provided on the outer periphery of the stamp drum 284. The three stamp surfaces 290 are disposed at positions of equally dividing the circumference of the stamp drum 284 into three, and three engaging pieces 330 are provided at positions equally divided into three in the circumferential direction on the side surface of the stamp drum 284, the positions being different in the radial direction. A stopper 332 that determines a standby position of the stamp drum 284 upon engagement with the engaging piece 330 is held at an end of a solenoid 334 that holds it at three positions. Upon engagement of the stopper 332 and any one of the three engaging pieces 330 based upon the above-mentioned constitution, it is allowed to change the standby position of the stamp drum 284 and to change the mark of "processed" that will be printed on the papers.

We claim:

1. An automatic paper feeder comprising:

a pick roller disposed at a position where it comes into contact with a leading end of a paper to be taken out, the pick roller having a roller axis and a predetermined conveying direction;

a separator pad disposed come into contact with said pick roller and having a width in the axial direction of said roller;

a first pair of pick springs disposed to come into contact with said pick roller;

a second pick spring disposed to come into contact with said pick roller;

said first pick springs and said second pick spring being disposed to come into contact with said pick roller at different positions in said conveying direction; and said first pick springs being disposed in both regions on the outside of the width of said separator pad in the axial direction of the roller, said second pick spring being disposed in a region of the width of said separator pad in the axial direction of the pick roller, the pick spring of said first and second pick springs located on the upstream side in said conveying direction being brought into contact with said pick roller with a force smaller than a force with which the pick spring is brought into contact with the pick roller located on the downstream side.

2. An automatic paper feeder according to claim 1, wherein said separator pad is divided into a plurality of pad pieces that are in alignment in the axial direction of the pick roller at least at a portion of contacting to the pick roller, and said second pick spring is located between the two pad pieces that are neighboring each other.

3. An automatic paper feeder according to claim 2, wherein said first pick springs are disposed to come into contact with said pick roller at positions on the upstream side of said second pick spring in the direction of conveyance.

4. An automatic paper feeder according to claim 1, further comprising first and second urging members for urging the back surface of a portion of said separator pad contacting said pick roller toward said pick roller, said first urging member being brought into contact with the separator pad at a first urging position, said second urging member being brought into contact with the separator pad at a second urging position, said first urging position being on the upstream side of said second urging position in the direction of conveyance.

5. An automatic paper feeder according to claim 4, wherein said separator pad is divided into a plurality of pad pieces that are in alignment in the axial direction of the pick roller at least at a portion of contacting to the pick roller, and at least either one of said first and second urging members is provided for each of the plurality of pad pieces of the separator pad.

6. An automatic paper feeder according to claim 5, wherein the first and second pick springs, and at least one of the first and second urging members, are formed as a spring unit formed from a spring plate by cutting and folding thereof.

7. An automatic paper feeder according to claim 1, further comprising a fixed bracket disposed on the opposite side of said pick roller from said separator pad, and a pad holder made of a resin and integrally forming a holding portion of said separator pad disposed on the side of said pick roller forming a gap relative to said pick roller and an engaging portion engaging with said bracket, the end of said pad holder being inclined like a wedge, wherein said engaging portion of said pad holder is engaged with said bracket so that said separator pad is held between said bracket and the holding portion of said pad holder.

8. An automatic paper feeder according to claim 1, further comprising a fixed bracket disposed on the opposite side of said pick roller from said separator pad, and a pad holder made of a resin and integrally forming a holding portion of said separator pad disposed on the side of said pick roller forming a gap relative to said pick roller and an engaging portion engaging with said bracket, the end of said pad holder being inclined like a wedge, wherein said engaging portion of said pad holder is engaged with said bracket so that said separator pad is held between said bracket and the holding portion of said pad holder, and a web of said spring unit is sandwiched between said bracket and said separator pad so as to be held by the holding portion of said pad holder together with said separator pad.

9. An automatic paper feeder according to claim 1, further comprising a fixed lower frame and an upwardly openedable upper frame said lower frame and said upper frame forming a paper passage that traverses the automatic paper feeder, said paper passage being opened when said upper frame is opened, wherein said lower frame and said upper frame are plastic molded articles, said molded articles having paper guide surfaces as a unitary structure to form said paper passage and having means for supporting the shaft of said pick roller and the shaft of the feed roller on the side walls thereof.

10. An automatic paper feeder according to claim 9, wherein one of the lower frame and the upper frame has side walls of a double structure including an inner side plate and an outer side plate, a side wall of the other frame being located on the inside of the side walls of said one frame, and the inner side plate of one frame and the side wall of the other frame having means for supporting the shaft of said pick roller and the shaft of the feed roller.

11. An automatic paper feeder according to claim 10, wherein means for supporting the shaft of said pick roller and the shaft of the feed roller has bearings fitted in holes formed in said molded articles at portions that do not appear on the surfaces of the side plates, the ends on one side of the shafts of said pick roller and said feed roller are supported being inhibited from moving in the axial direction, and the ends on the other side thereof are supported to move in the axial direction.

12. An automatic paper feeder according to claim 10, wherein a guide surface for guiding the lower surface of the paper is formed by a sheet-like upper panel plate which couples the two side walls together and which undergoes resilient deflection, and reinforcing ribs are provided on the lower side of said upper panel plate like comb teeth extending in the direction of conveying the paper.

13. An automatic paper feeder according to claim 10, wherein reinforcing ribs are formed in the lower side of the resiliently deflecting upper panel plate of the upper frame that forms an upper surface of outer walls of the device, the reinforcing ribs being integrally formed like comb teeth and extending in a direction in which the paper is conveyed, the ends of the reinforcing ribs guiding the paper.

14. An automatic paper feeder according to claim 10, wherein a strip-like metallic paper guide which is elongated in the direction of width of the paper is secured at its end in the lengthwise direction thereof to the side wall of the upper frame, secured at the other end to the side wall of the upper frame being allowed to move in the lengthwise direction, and is disposed with its central portion in contact with the end of the comb teeth-shaped reinforcing ribs, and said paper guide forms a guide for the papers.

15. An automatic paper feeder according to claim 10, wherein a nip roller of the feed roller is rotatatingly supported at the central portion of the resiliently deflecting upper panel plate of a plastic frame, and is pushed onto the feed roller due to the resilient restoring force produced by the deflection of said upper panel plate in the direction of width of the paper.

16. An automatic paper feeder according to claim 9, wherein a synthetic resin forming the lower frame and the upper frame has the same coefficient of thermal expansion as the plastic frame of the data processor mounting the automatic paper feeder.

17. An automatic paper feeder according to claim 1, further comprising at least one feed roller arranged on the downstream side of said pick roller in the direction of conveyance, a motor capable of rotating said pick roller and at least one feed roller in either the forward direction or the reverse direction and rotating at least one feed roller in said direction of conveyance, a stamp drum which rotates together with at least one feed roller, a one-way clutch which, when said motor is rotated forward, separates said motor from the stamp drum and, when said motor is rotated reverse, couples said motor to the stamp drum, and a holding member which, when the motor rotates forward, holds the stamp drum at a standby position.

18. An automatic paper feeder according to claim 17, wherein the stamp drum is mounted on the roller shaft of at least one feed roller via the one-way clutch, the diameter of said stamp drum is smaller than the diameter of said at least one feed roller, and said stamp drum has a stamp surface that is slightly larger than the diameter of said at least one feed roller.

19. An automatic paper feeder according to claim 17, wherein the stamp drum is mounted on a stamp shaft which is in parallel with at least one feed roller, and a one-way clutch for preventing the reversal rotation is provided between said motor and the roller shaft of at least said one feed roller to transmit the forward rotation only of said motor to said at least one feed roller.

20. An automatic paper feeder according to claim 17, wherein the stamp drum is mounted on a stamp shaft which is in parallel with the roller shaft of at least one feed roller, a forward rotation transmission device and a reverse rotation transmission device are provided in parallel between said motor and said at least one feed roller, provision is made of a one-way clutch for transmitting forward rotation which, when said motor rotates forward, couples said motor to said at least one feed roller via said forward rotation transmission device and a one-way clutch for transmitting reverse rotation which, when said motor rotates reverse, couples said motor to said at least one feed roller via said reverse rotation transmission device, said stamp drum being mounted on said stamp shaft via a one-way clutch which, when the motor rotates reverse, is locked to rotate the stamp drum in a direction in which the paper is discharged.

21. An automatic paper feeder according to claim 17, wherein a sensor for detecting the end of the paper is provided at a position close to said at least one feed roller on a side from which the paper is introduced.

22. An automatic paper feeder according to claim 17, wherein said stamp drum has a slit, and provision is made of a photoelectric sensor for detecting the rotational position of said slit.

23. An automatic paper feeder according to claim 17, wherein provision is made of a device for feeding an ink to the stamp surface.

24. An automatic paper feeder according to claim 17, wherein provision is made of a stopper for defining the standby position of the stamp drum, a plurality of engaging pieces that engage with said stopper, and a stopper advancing/retracting means for selectively advancing or retracting said stopper.

* * * * *

UNITED STATES PATENT AND TRADEMARK OFFICE
CERTIFICATE OF CORRECTION

PATENT NO. : 5,573,338
DATED : November 12, 1996
INVENTOR(S) : Morikawa et al

It is certified that error appears in the above-indentified patent and that said Letters Patent is hereby corrected as shown below:

On the title page:

Item [30], line 3, delete "March 17, 1994" and insert therefor --April 8, 1994--

Item [30], line 4, delete "April 8, 1994" and insert therefor --March 17, 1994--

Signed and Sealed this

Twenty-ninth Day of April, 1997

Attest:

BRUCE LEHMAN

Attesting Officer

Commissioner of Patents and Trademarks